United States Patent
Jain et al.

(10) Patent No.: US 12,321,849 B1
(45) Date of Patent: Jun. 3, 2025

(54) PERFORMING HARDWARE OPERATOR FUSION

(71) Applicant: Amazon Technologies, Inc., Seattle, WA (US)

(72) Inventors: Animesh Jain, Sunnyvale, CA (US); Tobias Joseph Kastulus Edler von Koch, Austin, TX (US); Yizhi Liu, Fremont, CA (US); Taemin Kim, Portland, OR (US); Jindrich Zejda, Saratoga, CA (US); Yida Wang, Palo Alto, CA (US); Vinod Sharma, Menlo Park, CA (US); Richard John Heaton, San Jose, CA (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/238,722

(22) Filed: Aug. 28, 2023

Related U.S. Application Data

(63) Continuation of application No. 16/698,753, filed on Nov. 27, 2019, now Pat. No. 11,809,981.

(51) Int. Cl.
*G06N 3/063* (2023.01)
*G06F 9/30* (2018.01)
*G06F 9/54* (2006.01)

(52) U.S. Cl.
CPC ......... *G06N 3/063* (2013.01); *G06F 9/30007* (2013.01); *G06F 9/545* (2013.01)

(58) Field of Classification Search
CPC ...... G06N 3/063; G06F 9/30007; G06F 9/545
USPC .......................................................... 706/15
See application file for complete search history.

(56) References Cited

U.S. PATENT DOCUMENTS

| | | | |
|---|---|---|---|
| 6,119,223 A | 9/2000 | Witt | |
| 6,260,136 B1 | 7/2001 | Kabuo | |
| 10,324,724 B2 * | 6/2019 | Lai | ........ G06F 9/3017 |
| 2016/0179535 A1 | 6/2016 | Chen et al. | |
| 2017/0024847 A1 | 1/2017 | Engh-halstvedt et al. | |

(Continued)

OTHER PUBLICATIONS

U.S. Appl. No. 16/698,753, "Advisory Action," mailed Nov. 28, 2022, 3 pages.

(Continued)

*Primary Examiner* — Chun Kuan Lee
(74) *Attorney, Agent, or Firm* — Kilpatrick Townsend & Stockton LLP

(57) ABSTRACT

A method of generating executable instructions for a computing system is provided. The method comprises: receiving a first set of instructions including a kernel of a first operator and a kernel of a second operator, the kernel of the first operator including instructions of the first operator and write instructions to a virtual data node, the kernel of the second operator including instructions of the second operator and read instructions to the virtual data node; determining, based on a mapping between the write instructions and read instructions, instructions of data transfer operations between the first operator and the second operator; and generating a second set of instructions representing a fused operator of the first operator and the second operator, the second set of instructions including the instructions of the first operator, the instructions of the second operator, and the instructions of the data transfer operations.

20 Claims, 17 Drawing Sheets

(56) References Cited

U.S. PATENT DOCUMENTS

2019/0196832 A1    6/2019   Vasekin et al.
2020/0042322 A1*   2/2020   Wang .................. G06F 9/30043
2020/0387377 A1   12/2020   Tseng et al.
2022/0405221 A1   12/2022   Wang et al.

OTHER PUBLICATIONS

U.S. Appl. No. 16/698,753, "Final Office Action," mailed Sep. 7, 2022, 13 pages.
U.S. Appl. No. 16/698,753, "Non-Final Office Action," mailed May 9, 2022, 12 pages.
U.S. Appl. No. 16/698,753, "Non-Final Office Action," mailed Jan. 30, 2023, 15 pages.
U.S. Appl. No. 16/698,753, "Notice of Allowance," mailed Jun. 23, 2023, 10 pages.

* cited by examiner

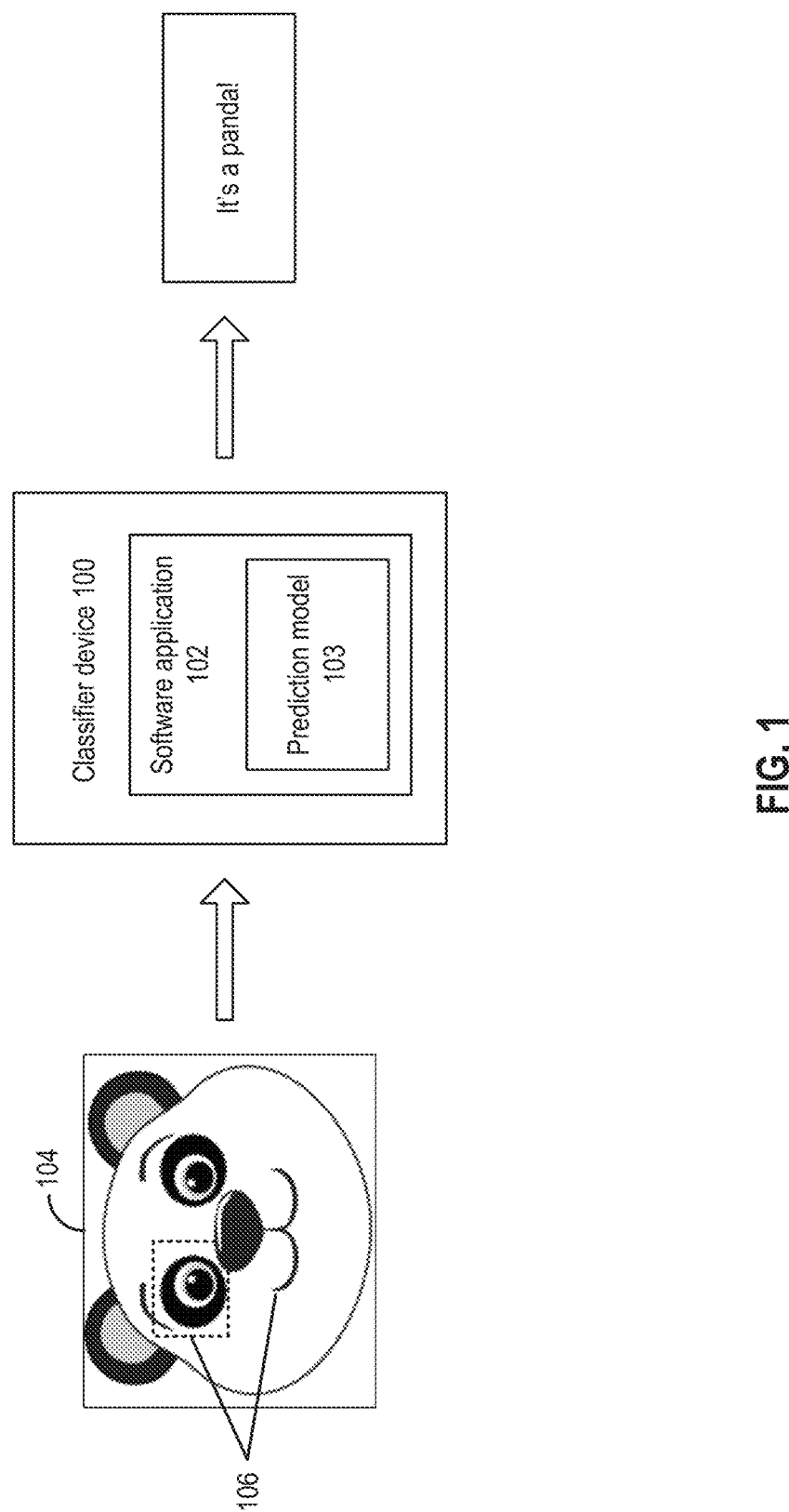

322

Mem_read (Address_R1, $i_0$)
Mem_read (Address_R2, $i_1$)
... } — 323

$[a_0, a_1, ....] = op1(i_0, i_1, ...)$ } — 325

Mem_write (Address_W1, $a_0$)
Mem_write (Address_W2, $a_1$)
... } — 327

600 ⇢

602 — Receiving a first set of instructions including a kernel of a first operator and a second kernel of a second operator, the kernel of the first operator including instructions of the first operator and write instructions to a virtual node, the kernel of the second operator including instructions of the second operator and read instructions to the virtual node

604 — Determining, based on a mapping between the write instructions and read instructions, instructions of data transfer operations between the first operator and the second operator via a memory

606 — Generating a second set of instructions representing a fused operator of the first operator and the second operator, the second set of instructions being executable by the computing system and including the instructions of the first operator, the instructions of the second operator, and the instructions of the data transfer operations

FIG. 6

PERFORMING HARDWARE OPERATOR FUSION

CROSS-REFERENCE TO RELATED APPLICATION

This application a continuation of and claims priority to U.S. patent application Ser. No. 16/698,753, filed Nov. 27, 2019, and entitled "PERFORMING HARDWARE OPERATOR FUSION," the content of which is hereby incorporated by reference in its entirety for all purposes.

BACKGROUND

Artificial neural networks are computing systems with an architecture based on biological neural networks. Artificial neural networks can be trained, using training data, to learn about how to perform a certain computing task for an application.

A hardware accelerator, such as a neural network processor, can implement a sequence of operators for different layers of the artificial neural network. The operations involved in each operator/layer may involve, for example, multiplication and summation operations, activation function processing, pooling, etc. In some cases, based on the operators' properties, the hardware accelerator can be programmed to implement a fused operator that combines the functions of multiple operators, which can reduce the latency of data transfer between the operators/layers and improve performance.

BRIEF DESCRIPTION OF THE DRAWINGS

Various embodiments in accordance with the present disclosure will be described with reference to the drawings, in which:

FIG. 1 illustrates an example a classifier device that uses techniques disclosed herein to process data;

FIG. 6 illustrates an example method of generating executable instructions for a computing system, according to certain aspects of the present disclosure;

DETAILED DESCRIPTION

Figure 2A:
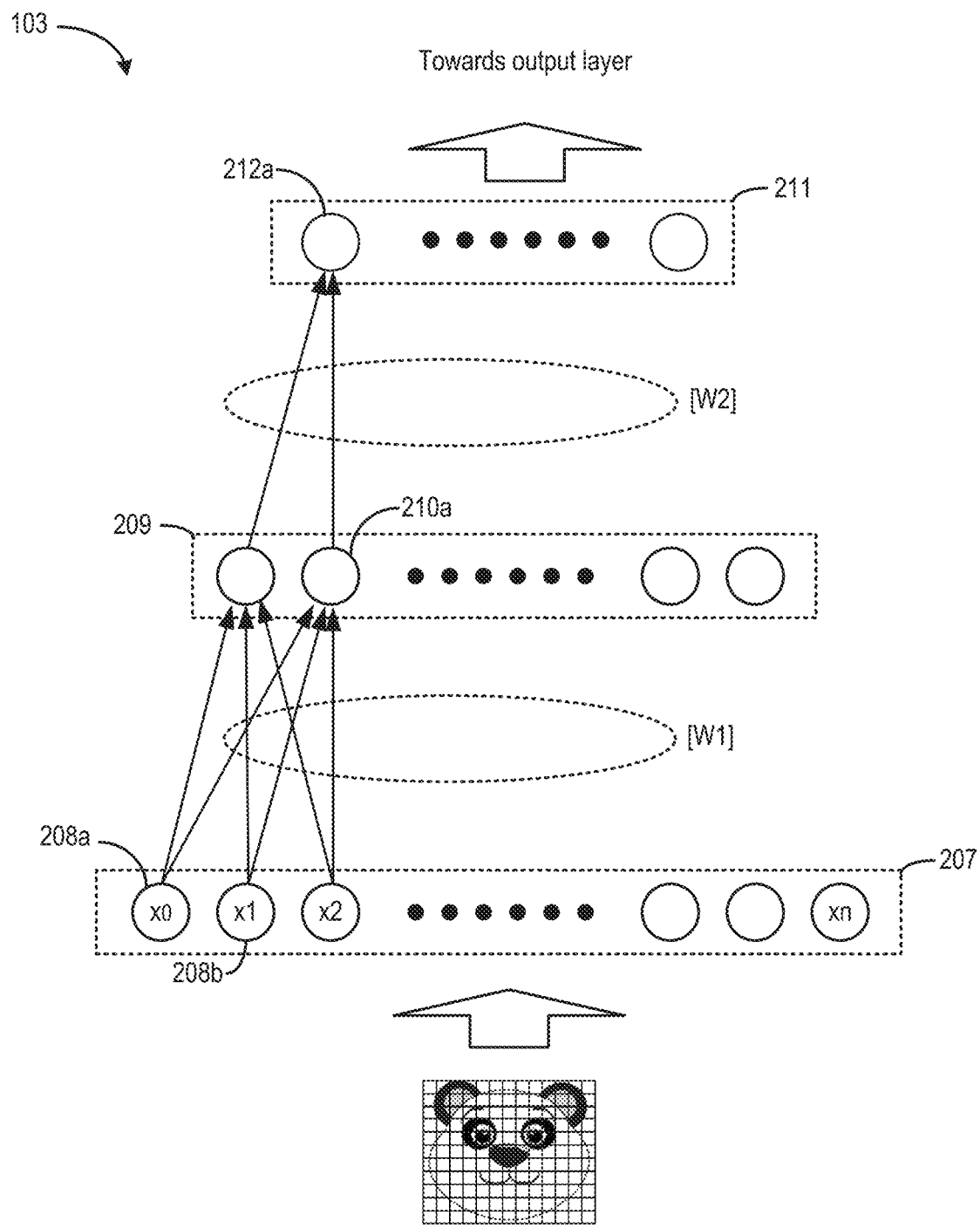
FIGS. 2A-2D are simplified block diagrams illustrating a prediction model and the computations that use techniques disclosed herein, according to certain aspects of the present disclosure.

Examples of the present disclosure relate to hardware accelerators, and more specifically, techniques to synchronize operations in a hardware accelerator.

An artificial neural network typically consist of a sequence of layers/operators. The operations involved in each operator/layer may involve, for example, multiplication and summation operations, activation function processing, pooling, etc. Depending on the topology of the neural network (e.g., convolutional neural network, fully-connected deep neural network, etc.), the connectivity between layers, which describes how the outputs of the first operator/layer connect with the inputs of the second operator/layer, can also be different. An artificial neural network can be implemented in various computing systems, such as a general purpose central processing unit (CPU), a hardware accelerator, etc.

A computing system can be programmed to implement a multi-layer artificial neural network. The instruction file may include a plurality of kernels, with each kernel including instructions that define the operations involved in a layer/operator. The computing system can execute a kernel of a first operator, generate a first intermediate tensor, and store the first intermediate tensor at an off-chip memory (e.g., DRAM). The computing system can then execute a kernel of a second operator. To execute the second kernel, the computing system can fetch the first intermediate tensor from the memory, map the first intermediate tensor to the inputs of the second operator based on the connectivity between the two operators/layers, and execute the second kernel to generate a third intermediate tensor. The computing system can store the third intermediate tensor back to the memory, and then repeat the execution and memory access operations for subsequent layers/operators.

The memory access operations between the execution of kernels incur huge latency. As the number of layers/operators grow, the accumulative memory access latency can present a huge bottleneck to the neural network operation. One technique to reduce the accumulative memory access latency and the resulting bottleneck is by operator fusion, in which multiple operators can be fused/combined to form a single macro operator. Data transfer between the operators within the single macro operator can be performed via a software or hardware managed on-chip memory (e.g., a SRAM cache) which is typically much faster than off-chip memory. A single fused kernel of the single macro operator can be created to include the instructions for the operators, as well as instructions that manage the transfer of data between the operators to reflect the connectivity between the operators. A computing system can then be programmed by the fused kernel to implement the single macro operator. With the memory access latency substantially reduced, the performance of the computing system in executing the single kernel can be substantially improved.

Although operator fusion can substantially improve the performance of the computing system, the creation of fused kernels to support operator fusion can involve substantial engineering effort. The complexity of a compiler that compiles the kernels into executable instructions also increases, as the compiler needs to be able to identify fused kernels. The problem is further exacerbated due to different neural network topologies giving rise to a large number of potential operator fusions, which requires a large engineering effort to create the fused kernels for each of these potential operator fusions, while the complexity of the compiler also increases in order to identify the various fused kernels. As a result, engineering effort, as well as compiler complexity, can become a bottleneck in improving the performance of the computing system across a wide range of neural network topologies.

In addition, creating fused kernels for a hardware accelerator can present extra challenges. Specifically, the on-chip memory of the hardware accelerator, which can act as a scratchpad memory, is typically managed by the kernel. As part of the management, the kernel needs to divide the data to be stored into the on-chip memory by one operator into data slices to fit into the memory. The data slices are then fetched to the next operator based on the connectivity between the operators. A fused kernel needs to include instructions to indicate where the data slices are stored in the on-chip memory and how the data slices are fetched from the on-chip memory, to control the data movement between the operators. Orchestrating such data movements and compute operations for these slices across operators is tedious and error-prone, which can further increase the engineering effort required to support different fused operators and for different neural network topologies.

Examples of the present disclosure relate to a method of generating execution instructions for fused neural network operators. The method can be performed by a compiler. The method may include receiving a kernel of a first operator ("a first kernel"). The first kernel includes instructions of the first operator and write instructions to a virtual data node. The method may also include receiving a kernel of a second operator ("a second kernel"). The second kernel includes instructions of the second operator and read instructions to the virtual data node. The method may further include determining, based on a mapping between the write instructions and read instructions, instructions of data transfer operations between the first operator and the second operator, and generating an instruction file representing a fused operator of the first operator and the second operator and including the instructions of the first operator, the instructions of the second operator, and the instructions of the data transfer operations.

Specifically, the virtual data node can represent a logical tensor of the output data elements by the first operator. Each output data element of the first operator may be associated with a tensor address (e.g., coordinates) within the logical tensor represented by the virtual data node. The write instructions in the first kernel can include the tensor addresses to which the output data elements are to be stored. Moreover, the read instructions in the second kernel can include the tensor addresses of the output data elements (of the first operator) to be included in each input data element to the second operator. As such, each read instruction in the second kernel can be mapped to one or more write instructions, and each write instruction can be mapped to one or more read instructions, based on the tensor addresses included in the read and write instructions. The mapping between the read and write instructions can represent a mapping between the output data elements of the first operator and the input data elements to the second operator, which in turn can be defined based on the connectivity between the neural network layers represented by the two operators.

To generate the instructions of the data transfer operations between the two operators, the compiler can perform a splitting operation to split the virtual data node into one or more virtual data sub-nodes, and performing a vertical fusion operation on each virtual data sub-node to generate write and read instructions to represent a data transfer operation for each virtual data sub-node.

Specifically, as part of the splitting operation, the compiler can determine, for each read instruction at the virtual data node for an input data element to the second operator, one or more corresponding write instructions that supply the output data element(s) of the first operator included in the input data element, based on the tensor addresses included in the read and write instructions. The compiler can create multiple access groups each including one or more read instructions that read from the same set of tensor address(es). The compiler can create a virtual data sub-node for each access group. Each virtual data sub-node can include the one or more read instructions included in an access group, as well as the write instructions to the set of tensor addresses read by the read instructions, to perform data transfer operations. The data transfer operations of different virtual data sub-nodes can be performed in parallel at a memory to increase the speed of the data transfer operations.

As to be described below, as a result of the splitting operation, a write operation directed to the same tensor address can appear in multiple access groups. While such arrangements can facilitate parallel data transfer operations, the duplication of the write operations can lead to more data written into the memory. To reduce memory usage, the compiler can look for a first access group that has a subset of corresponding write instructions for a read instruction, and add the corresponding write instructions and the read instruction to the first access group if the projected total amount of data written by the subset of the corresponding write instructions, and the additional write instructions for the read instruction, is below a threshold. If the projected total amount of data exceeds the threshold, the compiler can look for a second access group that includes the corresponding write instructions and, if the second access group can be found, add the read instruction to the second access group. If neither the first access group nor the second access group can be found, the compiler can then create a new access group for the read instruction and the corresponding write instructions, as described above. With such arrangements, the compiler can include more read and write instructions in an access group to reduce the duplication of the same write instruction across different access groups, to reduce the risk of over-capacity at the memory caused by duplicated data transfer operations.

After splitting the virtual data node into virtual data sub-nodes, the compiler can perform a vertical fusion operation on each virtual data sub-node. Specifically, the compiler can generate a memory read instruction and a memory write instruction to a memory for each pair of corresponding read instruction and write instruction (to the same tensor address) at the virtual data sub-node. The compiler can also generate the memory read and memory write instructions and addresses based on the size and usage of the memory, and in a case where the memory cannot support the amount of data involved in the memory read and write, the compiler can instead generate read/write instructions to another larger memory (e.g., an off-chip memory, such as DRAM), to move the data operations to the off-chip memory. In a case where the virtual data sub-node includes read instructions that have no corresponding write instructions (or vice versa), such as in the case where the virtual data sub-node is at the input of the first operator or at the output of the second operator, the compiler can also generate off-chip memory read or off-chip memory write instructions for the virtual data sub-node. The compiler can then generate an instruction file representing a fused operator of the first operator and the second operator and including the instructions of the first operator, the instructions of the second operator, and the memory read and memory write instructions for the data transfer.

In some examples, the compiler can generate instructions for the data transfer operations between operators at an on-chip memory by default to maximize the number of operators to be fused. The compiler can remove an operator from the fused operators when, for example, limitations from the computing system prevent the fusion of that operator with other operators. Such limitations may arise from various sources. For example, the data can be of multi-channel and a particular channel of data needs to be accessed at a particular time, but the on-chip memory cannot provide such access at that time. As another example, the on-chip memory is simply too small to fit the multi-channel data. In all these cases, the compiler can exclude an operator from the fused operators and generate off-chip memory read/write instructions to handle data transfer between that operator and the other fused operators.

With the disclosed techniques, a computing system (e.g., a hardware accelerator, a CPU, etc.) can be programmed to perform operator fusion by an instruction file generated from standalone kernels of each operator, as well as virtual data nodes that represent logical tensors as inputs to an operator, outputs of an operator, or intermediate outputs between two operators. Each standalone kernel operates on a logical tensor represented by a virtual data node, which is generic and is not tied to any specific memory or memory management scheme. A wide variety of fused operators can then be implemented based on different combinations of standalone kernels and virtual data nodes. All these can substantially reduce the engineering effort as well as the complexity of compiler needed to support operator fusion, which in turn can improve the performance of the computing systems in implementing deep neural networks comprising a large number of operators/layers.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n} (W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

Figure 2B:
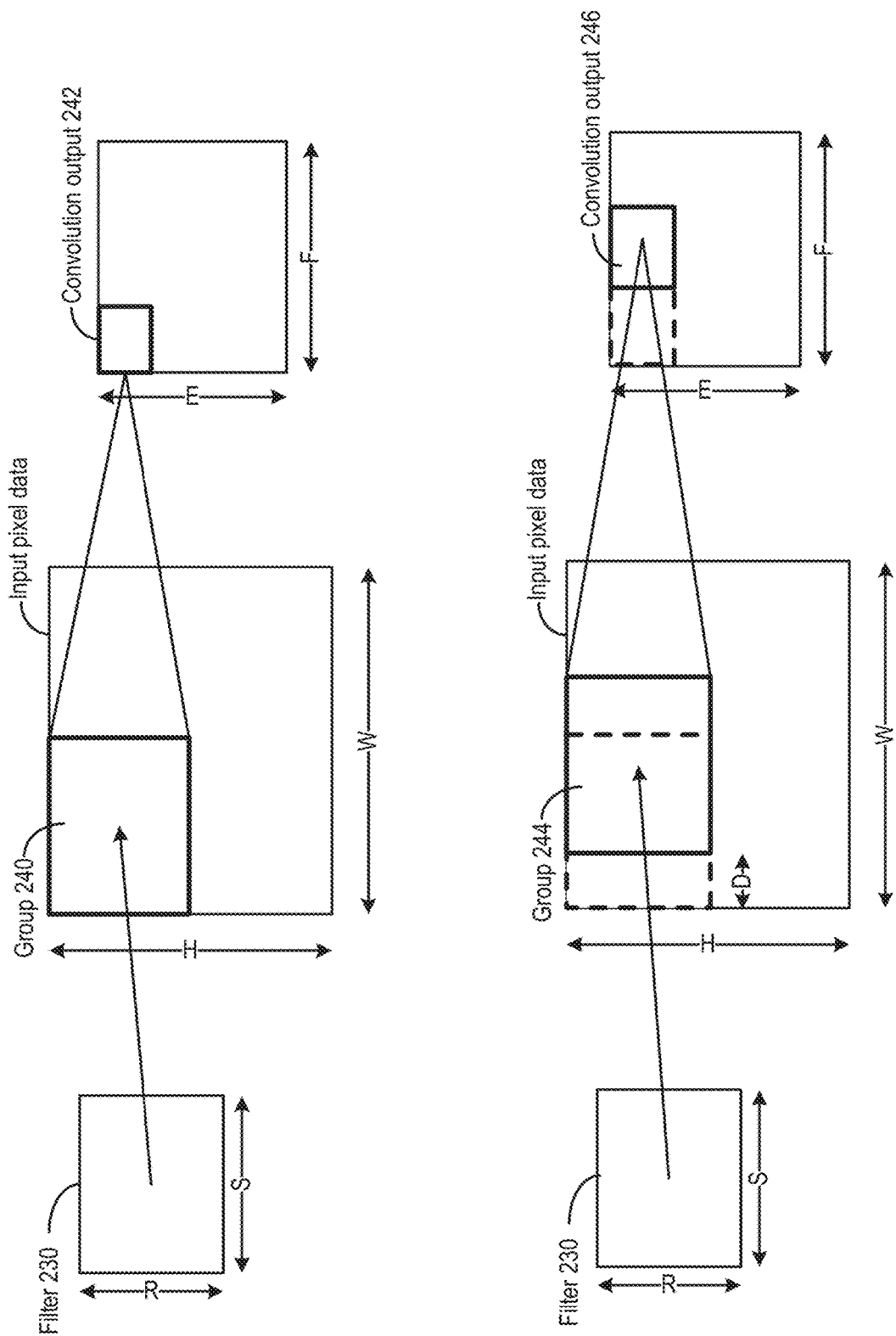

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Figure 2C:
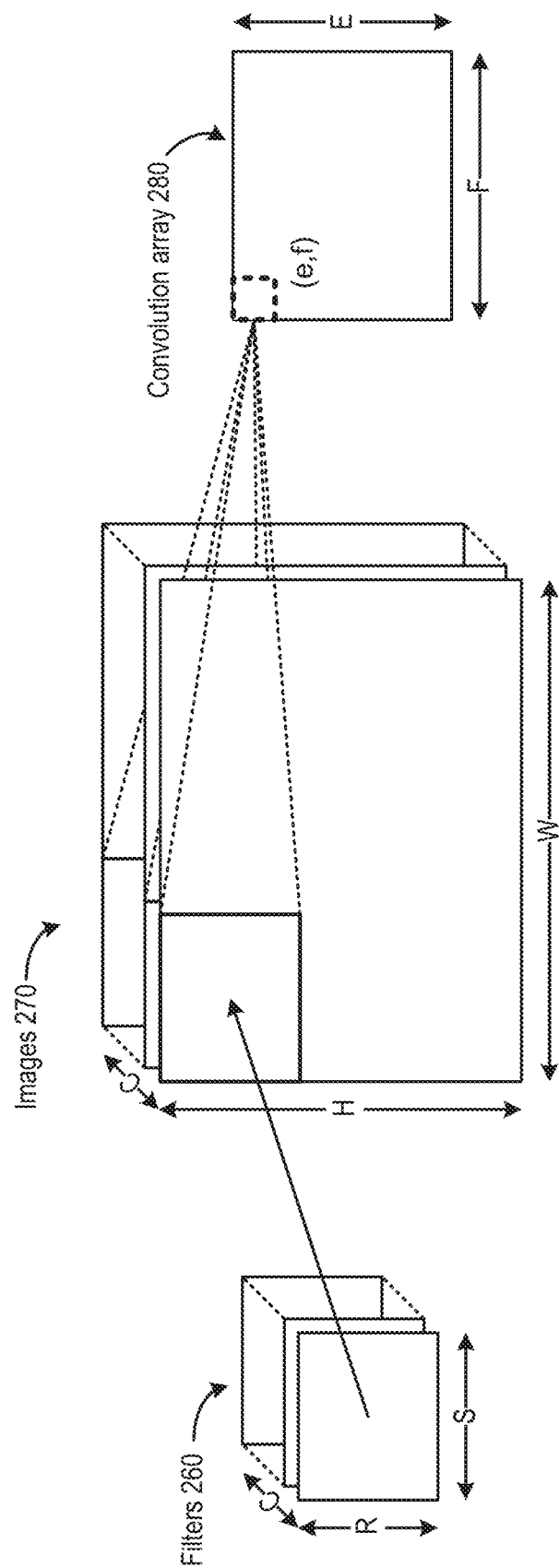

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. Each of images 270 can corresponds to an input channel. The convolution results for each filter-image pair can be summed to generate a convolution output as follows:

$$O_{e,f} = \sum_{r=0}^{R-1} \sum_{s=0}^{S-1} \sum_{c=0}^{C-1} X^c_{eD+r, fD+s} \times W^c_{r,s} \quad \text{(Equation 2)}$$

Here, the convolution operation involves the images (or pixel arrays). $X^c_{eD+r, fD+s}$ may refer to the value of a pixel at an image of index c, within the number (C) of images 270, with a row coordinate of eD+r and a column coordinate of fD+s. For the rest of the disclosure, the coordinates of element $X^c_{eD+r, fD+s}$ can be represented in the form of (eD+r, fD+s). The index c can denote a particular input channel. D is the sliding-window stride distance, whereas e and f correspond to the location of the data element in the convolution output array, which can also correspond to a particular sliding window. Further, r and s correspond to a particular location within the sliding window. A pixel at an (r, s) location and of an image of index c can also correspond to a weight $W^c_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^c_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. Each set of filters can correspond to an output channel. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^{m} = \sum_{r=0}^{R-1} \sum_{s=0}^{S-1} \sum_{c=0}^{C-1} X_{eD+r,fD+s}^{c} \times W_{r,s}^{c,m}$$ (Equation 3)

Here, convolution output $O_{e,f}^{m}$ and weight $W_{r,s}^{c,m}$ has an index m corresponding to one of the M sets of filters. The index m can denote a particular output channel.

Figure 2D:
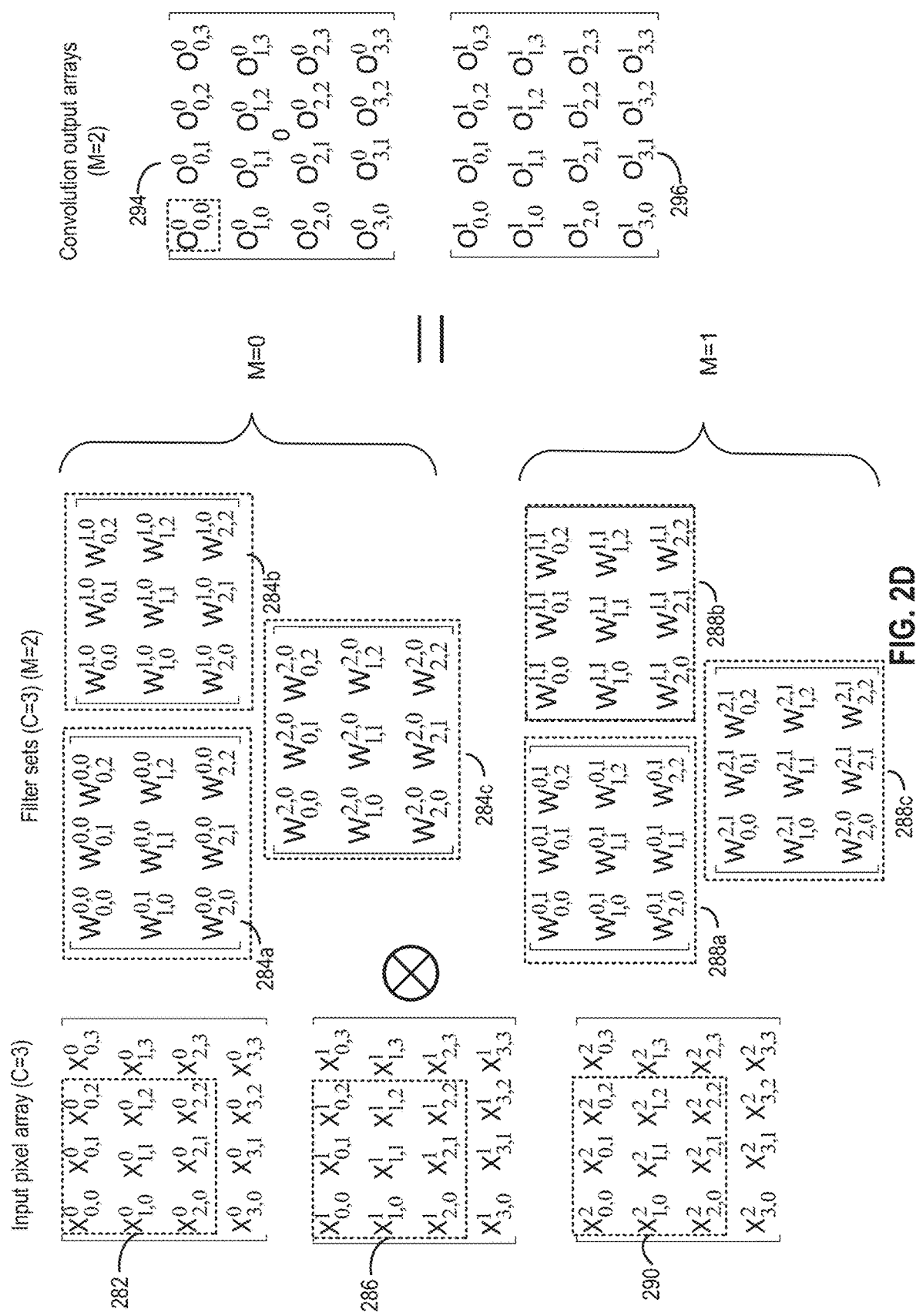

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data elements, with each set of output data elements corresponding to a convolution output array. Each convolution output array corresponds to convolving one set (of the M sets) of filters with the input pixel arrays. For example, $O_{0,0}^{0}$ can be generated by a sum of the dot-product between group of pixels 282 and filter array 284, the dot-product between group of pixels 286 and filter array 288, and the dot-product between group of pixels 289 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases}$$ (Equation 4)

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(Sum_{210a})$$ (Equation 5)

In some examples, a pooling operation can also be performed to reduce the number of outputs from layer 209. As part of the pooling operation, the outputs from layer 209 can be divided into groups, with one output generated from each group. The output can be generated based on, for example, selecting a maximum output from each group, averaging the outputs from each group, etc.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 3A:
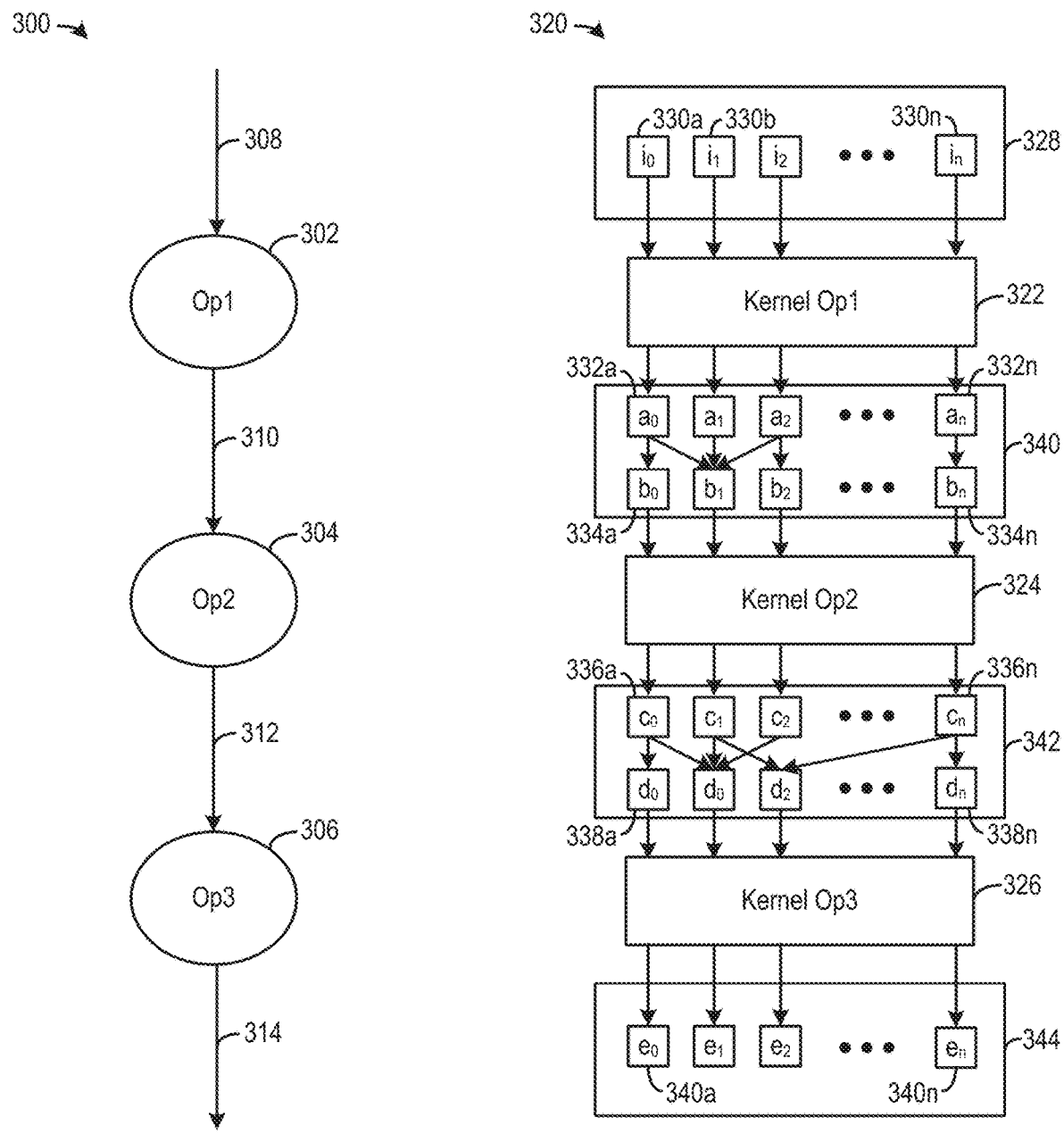
FIG. 3A-FIG. 3D illustrate examples of computational graph instructions that can be converted into executable instructions to be executed by a computing system to implement a neural network.

As described above, a neural network performs a sequence of computation operations to generate a decision. The sequence of computation operations can be represented by a computational graph. The left of FIG. 3A illustrates an example of a simplified computational graph 300 representing a sequence of operators. As shown in FIG. 3A, computation graph 300 includes a set of nodes 302, 304, and 306, as well as edges 308 and 310 connecting between the nodes. Each node in computation graph 300 can represent an operator, which can represent a neural network layer in, for example, prediction model 103. For example, node 302 can correspond to operator Op1 which can represent input layer 207 of FIG. 2A, node 304 can correspond to intermediate layer 209 of FIG. 2A, whereas node 306 can correspond to intermediate layer 211 of FIG. 2A. Moreover, edge 308 can represent flow of data from another node (not shown in FIG. 3A) to node 302 (input layer 207), edge 310 can represent flow of data from node 302 to node 304 (intermediate layer 209), edge 312 can represent flow of data from node 304 (intermediate layer 209) to node 306 (intermediate layer 211), whereas edge 314 can represent flow of data from node 306 to another node (not shown in FIG. 3A).

A computing system, such as a hardware accelerator, a CPU, etc., can be programmed by an instruction file to represent computational graph 300. The right of FIG. 3A illustrates a block diagram 320 of a sequence of instructions representing computation graph 300. Specifically, each operator represented by one of nodes 302, 304, or 306 can be represented by a set of kernel instructions which can define a set of operations for a neural network layer, such as multiplication and summation operations, activation function processing operations, pooling operations, etc., as described above in FIG. 2A-FIG. 2D and Equations 1 to 5. Node 302 (operator Op1) can be represented by kernel instructions 322, node 304 (operator Op2) can be represented by kernel instructions 324, whereas node 306 (operator Op3) can be represented by kernel instructions 326.

Figure 3B:
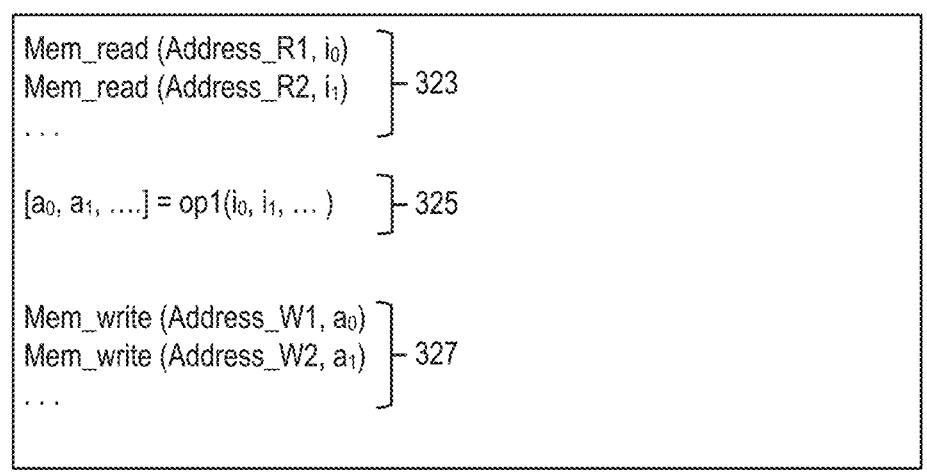

FIG. 3B illustrates an example of kernel instructions 322. As shown in FIG. 3B, kernel instructions 322 can include read instructions 323 to fetch input data elements from different read addresses of the memory (e.g., address_R1, address_R2, etc.), instructions 325 representing operations on the input data elements to generate output data elements, as well as write instructions 327 to store the output data elements back to different write addresses of the memory (e.g., address_W1, address_W2, etc.). The read and write addresses of the memory can be software addresses (e.g., virtual addresses) managed by the computing system. As a result, the memory access instructions included in the kernels can be generic and based only on the connectivity, and need not be specific for a particular memory or for a particular computing system.

Referring back to FIG. 3A, blocks 328, 340, 342, and 344 correspond to data transfer operations corresponding to, respectively, edges 308, 310, 312, and 312. The data transfer operations can be defined by the read and write instructions included in the kernel instructions. Each box in each block, such as boxes 330a, 330b, 330n, etc., can represent a data element (e.g., $i_0$), or of a chunk of corresponding data elements across multiple channels as in Equation 3 (e.g., $i_0^0$, $i_0^1$, $i_0^2$, etc.) which can be read or stored by an operator. For example, operator Op1 can read input data elements (e.g., $i_0$, $i_1$, etc.) represented by boxes 330, and store output data elements (e.g., $a_0$, $a_1$, etc.) represented by boxes 332 (e.g., box 332a, box 332n, etc.) at the memory. Operator Op2 can read input data elements (e.g., $b_0$, $b_1$, etc.) represented by boxes 334 (e.g., box 334a, box 334n, etc.) from the memory, and store output data elements (e.g., $c_0$, $c_1$, etc.) represented by boxes 336 (e.g., box 336a, box 336n, etc.) at the memory. Operator Op3 can read input data elements (e.g., $d_0$, $d_1$, etc.) represented by boxes 338 (e.g., box 338a, box 338n, etc.) from the memory, and store output data elements (e.g., $e_0$, $e_1$, etc.) represented by boxes 340 (e.g., box 340a, box 340n, etc.).

Moreover, blocks 340 and 342 also include a mapping between the data elements output by a producer operator and data elements read by a consumer operator, which can represent a data transfer operation between two operators. The mapping can reflect a connectivity between two neural network layers represented by the operators. For example, input data element b0 consumed by operator Op2 comes from output data element a0 output by operator Op1, which can reflect, for example, a node in operator/layer Op2 that reads b0 is connected only to a node in operator/layer Op1 that outputs a0. As another example, input data element b1 consumed by operator Op2 comes from output data elements a0, a1, and a2 output by operator Op1, which can reflect, for example, a node in operator/layer Op2 that reads b1 is connected to nodes in operator/layer Op1 that outputs a0, a1, and a2. Blocks 340 and 342 can have different mapping between input and output data elements which reflect different connectivity between layers. The data transfer can be performed by writing to and reading from the same address in the memory. For example, the mapping of a0 to b0 can be based on a write operation by operator Op1 to write a0 to an address in the memory, followed by a read operation at that address by operator Op2 to obtain b0. Moreover, the mapping of a0, a1, and a2 to b1 can be based on write operations by operator Op1 to write a0, a1, and a2 to three different addresses, followed by read operations at those addresses by operator Op2 to obtain b1.

A computing system, such as a hardware accelerator, a CPU, etc., can execute the operators Op1, Op2, and Op3, as well as the data transfer operations, by executing the kernel instructions 322, 324, and 326 as well as the read/write operations represented in blocks 328, 340, and 342. For example, the computing system can execute kernel instructions 322 to perform read operations from an off-chip memory (e.g., a DRAM) based on block 328 to obtain input data elements $i_0 \ldots i_n$ for operator Op1, perform operator Op1 to generate output data elements $a_0 \ldots a_n$, and then perform write operations based on block 340 to store the output data elements at the memory. The computing system can then execute kernel instructions 324 to perform read operations at the memory, based on the mapping defined in block 340, to obtain input data elements $b_0 \ldots b_n$ from the memory, perform operator Op2 to generate output data elements $c_0 \ldots c_n$, and then perform write operations based on block 342 to store the output data elements at the memory. The computing system can then execute kernel instructions 326 to perform read operations from the memory, based on the mapping defined in block 342, to obtain input data elements $d_0 \ldots d_n$ from the memory, perform operator Op3 to generate output data elements $e_0 \ldots e_n$, and then perform write operations based on boxes 334 to store the output data elements at the memory.

As each operator is represented by a set of kernel instructions, different neural network topologies comprising a sequence of these operators can be assembled based on these kernel instructions, with the connectivity between the operators represented by generic memory access instructions to off-chip memory. This enables modular and scalable programming of computing systems to implement different neural network topologies. Moreover, as the off-chip memory is typically managed by the computing system, the kernels can operate on software-based addresses (e.g., virtual addresses) and need not access the actual physical addresses or track the usage of the off-chip memory. All these can reduce engineering effort involved in developing the programs. Such arrangements, however, can lead to low performance in the computing system. Specifically, the accessing of off-chip memory between the execution of kernels can incur huge latency. As the number of layers/operators grow, the accumulative memory access latency can present a huge bottleneck to the neural network operation. As a result, the arrangements of FIG. 3A may not be suitable for implementing a deep neural network with many operators.

Figure 3C:
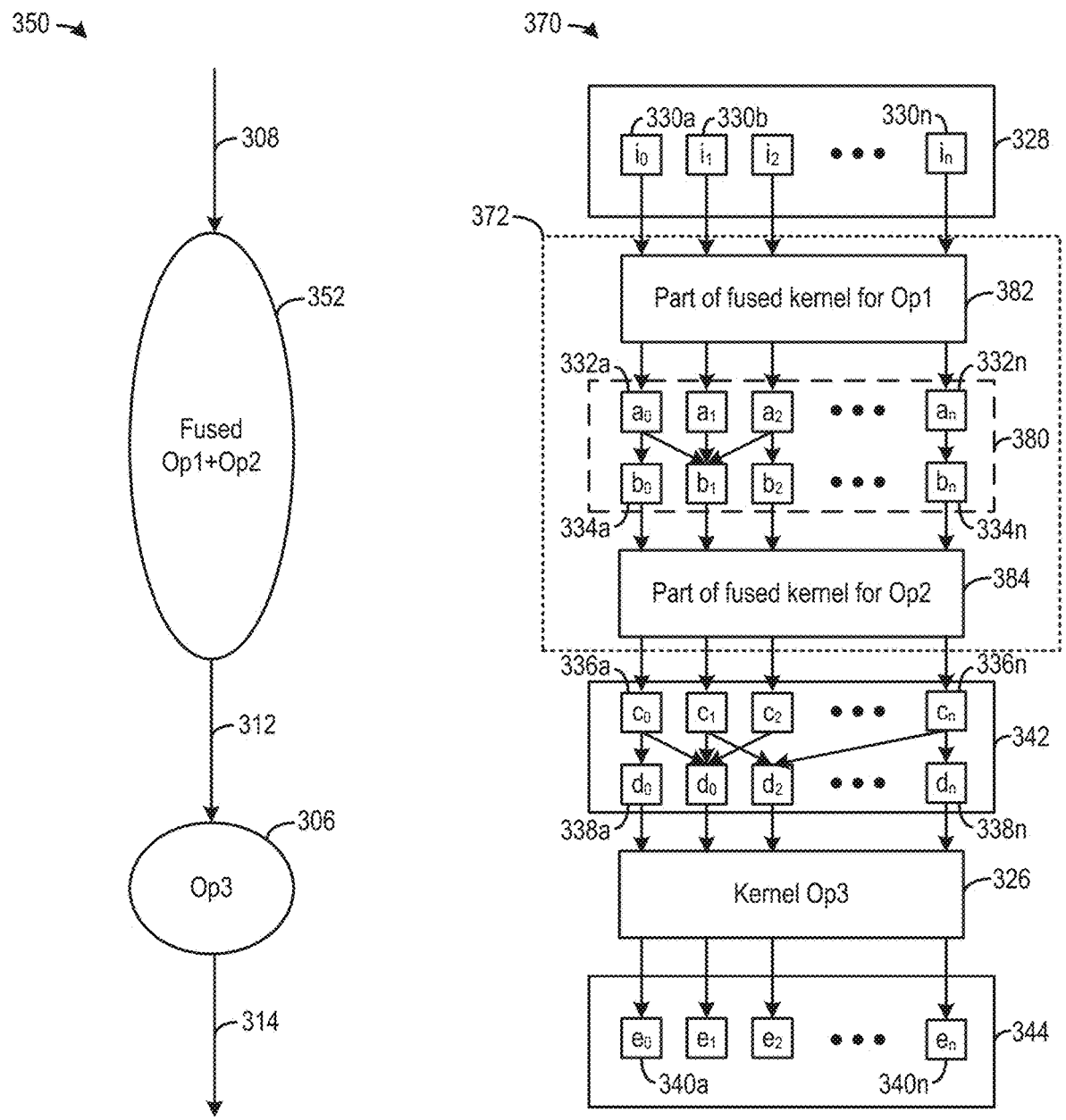

One technique to reduce the accumulative memory access latency and the resulting bottleneck is by operator fusion, in which multiple operators can be fused/combined to form a single macro operator. The left of FIG. 3C illustrates an example of operator fusion. As shown in FIG. 3C, computational graph 350 includes a node 352, which represents a macro operator of fusing operators Op1 and Op2, and node 306. The fused operator is connected to edge 308 to receive the same input data elements as operator Op1. The fused operator is also connected to node 306 via edge 312 and outputs the same output elements as operator Op2. The right of FIG. 3C illustrates a block diagram 370 representing an instruction file of computation graph 350. Block diagram 370 comprises a fused kernel 372 which includes instructions 382 for operator Op1, instructions 384 for operator Op2, as well as a block 380 representing the data transfer between operators Op1 and Op2. Block 380 can include access instructions to an on-chip memory, such as a scratchpad memory of a hardware accelerator, a SRAM cache of a CPU, etc., which is typically much faster than off-chip memory.

Figure 3D:
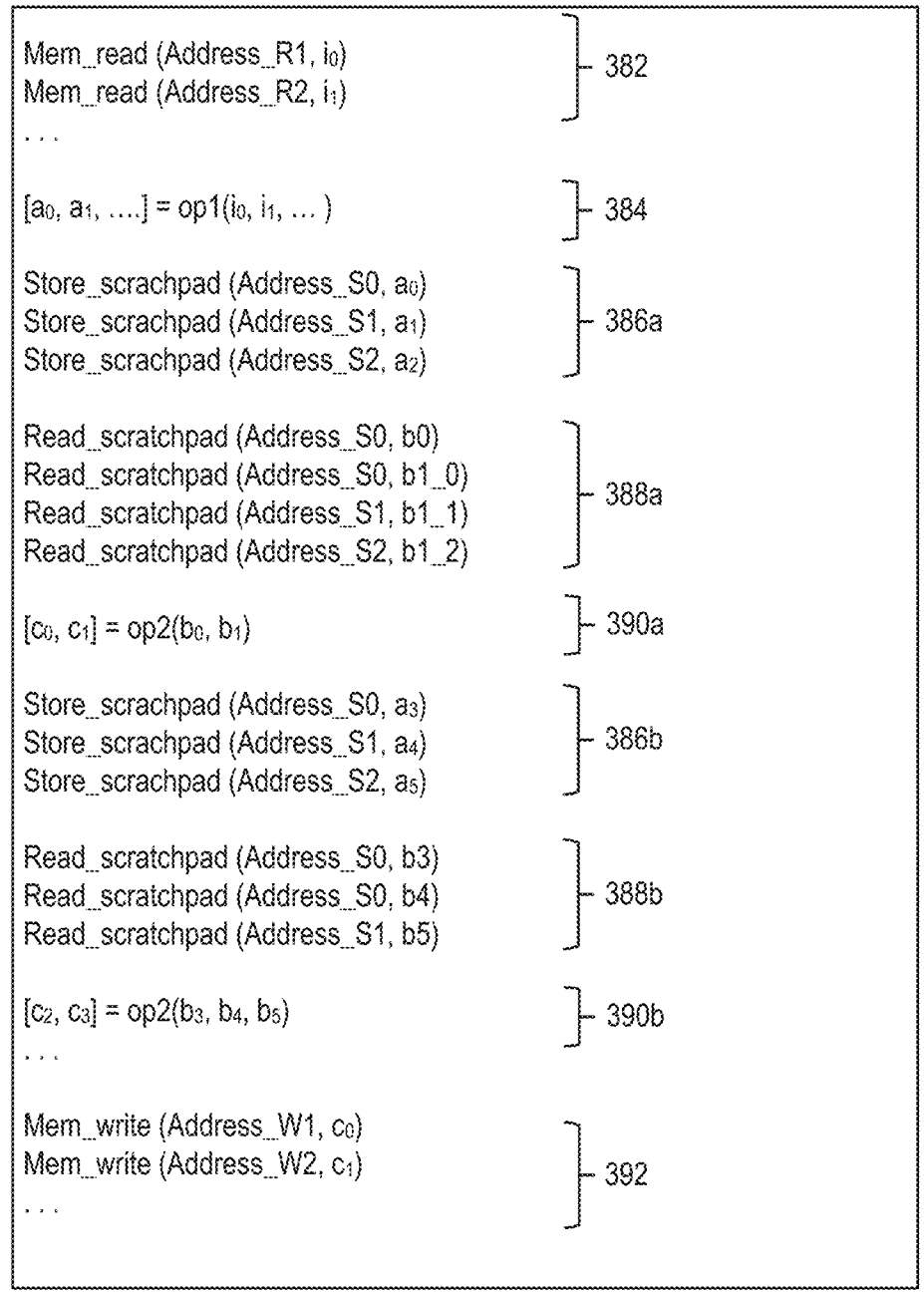

FIG. 3D illustrates an example of fused kernel instructions 372. As shown in FIG. 3D, kernel instructions 372 can include read instructions 382 to fetch input data elements $i_0 \ldots i_n$ from an off-chip memory, as well as operator instructions 384 representing application of first operator Op1 on the input data elements $i_0 \ldots i_n$ to generate output data elements $a_0 \ldots a_n$. Kernel instructions 372 further include store instructions 386 to store the output data elements $a_0 \ldots a_n$ at different addresses of a scratchpad memory, as well as read instructions 388 to fetch the output data elements from different addresses of the scratch pad memory to provide input data elements $b_0 \ldots b_n$ to the second operator Op2. The mapping of the scratchpad memory addresses between store instructions 386 and read instructions 388 can reflect the mapping in block 380 which reflects the connectivity between operators Op1 and Op2 as described above. Kernel instructions 372 further include operator instructions 390 representing application of second operator Op2 on the input data elements $b_0 \ldots b_n$ to generate output data elements $c_0 \ldots c_n$, as well as write instructions 392 to store the output data elements at the off-chip memory.

Compared with the arrangements of FIG. 3A and FIG. 3B, the operator fusion in FIG. 3C and FIG. 3D enables data transfer between operators to be performed at a fast memory (e.g., a scratchpad memory of a hardware accelerator, a cache of a CPU, etc.), which can reduce the accumulative memory access latency especially for a deep neural network comprising many operators. As a result, the performance of the computing system in executing the single kernel can be substantially improved.

Although operator fusion can substantially improve the performance of the computing system, the creation of fused kernels to support operator fusion can involve substantial engineering effort and increase the complexity of the compiler that processes the fused kernels. The problem is further exacerbated due to different neural network topologies giving rise to a large number of potential operator fusions. For example, referring to FIG. 3A, different fused kernels for different permutations of operator fusions (e.g., fusing operators Op1 and Op2, fusing operators Op2 and Op3, fusing operators Op1, Op2, and Op3, and fusing the operators arranged in different orders) may need to be created. Specifically, different neural network topologies may include different number of operators Op1, Op2, and Op3 and may use the operators in different orders. Moreover, the connectivity between different operators can also be different, as shown in blocks 340 and 342 of FIG. 3A. Developing the fused kernels to support all these different permutations may require substantial engineering effort. Moreover, the complexity of a compiler that compiles the kernels into executable instructions also increases, as the compiler needs to be able to identify a large number of fused kernels. As a result, engineering effort, as well as compiler complexity, can become a bottleneck in improving the performance of the computing system across a wide range of neural network topologies.

In addition, creating fused kernels for a hardware accelerator can present extra challenges. Specifically, as shown in FIG. 3D, a fused kernel may include access instructions, including instructions 386 and 388, to a scratchpad memory of a hardware accelerator to perform data transfer between operators Op1 and Op2. Unlike DRAM, the scratchpad memory is typically managed by the fused kernel. The management may include, for example, dividing the data to be stored into scratchpad memory into data slices to fit into the scratchpad memory, arranging the read and write operations in stages to ensure that the usage of the scratchpad memory at any time point is below the capacity of the scratchpad memory, allocating the physical addresses for storing the data elements, etc. As a result, the access instructions in the fused kernel may be specific for a particular scratchpad memory in a particular computing system. Moreover, the operator's instructions also need to tailored for the access instructions of the scratchpad memory. For example, the application of an operator on the input data needs to be performed in stages if the output data elements of the previous operator is stored in the scratchpad memory in stages due to space limitation of the scratch pad memory.

For example, in FIG. 3D, fused kernel 372 may include a first set of write instructions 386a to store a first set of output data elements of the first operator Op1 (e.g., $a_0$, $a_1$, and $a_2$) until the scratchpad memory is full, followed by a first set of read instructions 388a to fetch the first set of output data elements to assemble a first set of input data elements (e.g., b0, b1, etc.) for the second operator Op2, and followed by instruction 390a representing an application of the second operator Op2 on the first set of input data elements. Instruction 390a is then followed by a second set of write instructions 386b to store a second set of output data elements of the first operator Op1 (e.g., $a_3$, $a_4$, and $a_5$) until the scratchpad memory is full, followed by a second set of read instructions 388b to fetch the second set of output data elements to assemble a second set of input data elements (e.g., b3, b4, b5, etc.) for the second operator Op2, and followed by instruction 390b representing an application of the second operator Op2 on the second set of input data elements.

As shown in FIG. 3D, creating a fused kernel to orchestrate data movements and compute operations for data slices across operators within the constraint imposed by a particular scratchpad memory can be tedious and error-prone. The engineering effort required to create such fused kernels, as well as the complexity of the compiler, can be further increased to create different fused kernels to orchestrate different patterns of data movements and compute operations for different permutations of connectivity for different neural network topologies. As a result, engineering effort, as well as compiler complexity, can become a bottleneck in improving the performance of the computing system across a wide range of neural network topologies.

Figure 4A:
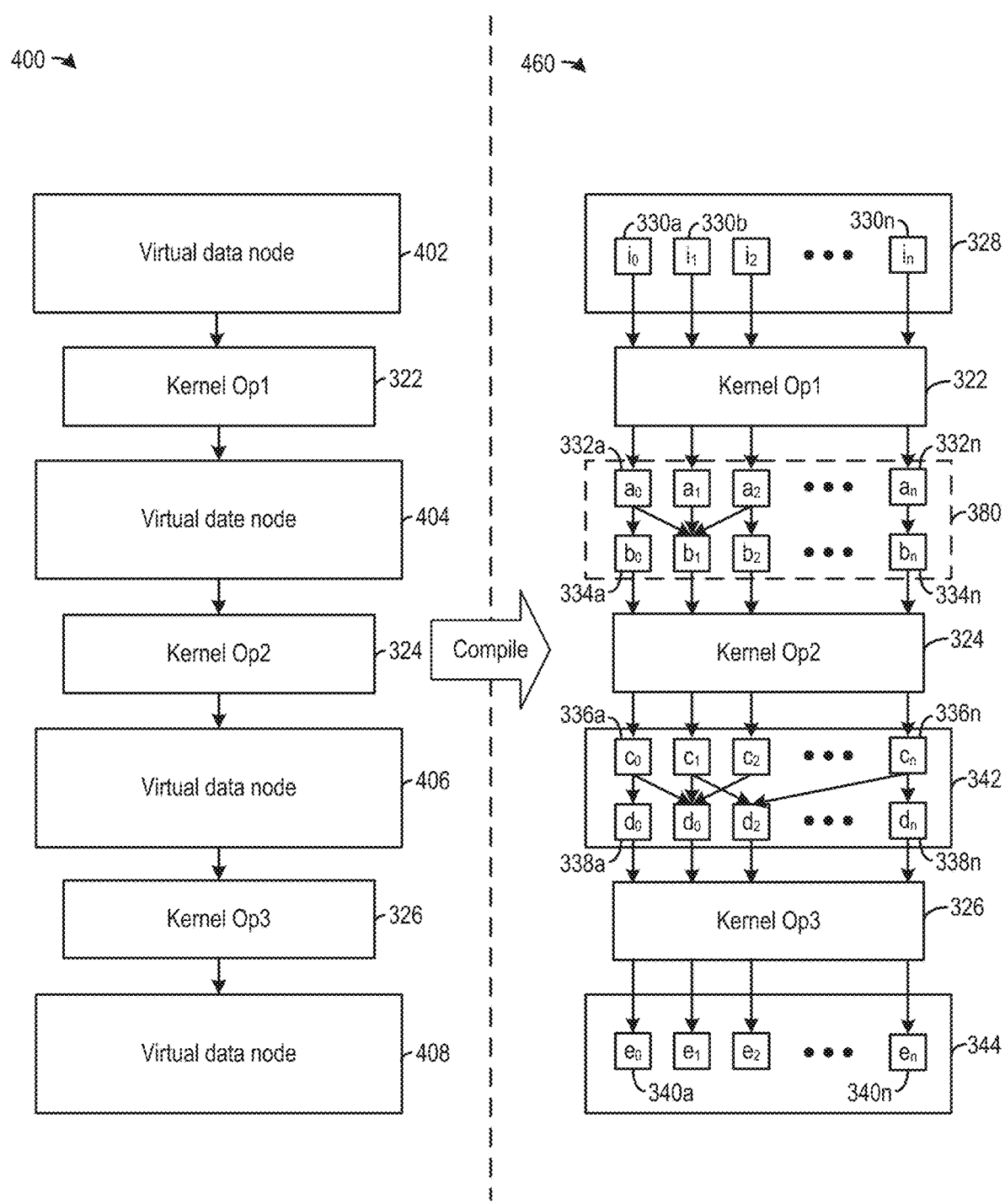
FIG. 4A-FIG. 4B illustrate example techniques of performing operator fusion in a compiler, according to certain aspects of the present disclosure.

FIG. 4A illustrates an example technique of performing operator fusion that can address at least some of the issues described above. The left of FIG. 4A shows block diagrams 400 of a sequence of instructions representing the computational graph 300 of FIG. 3A. In addition to kernel instructions 322 (which represent operator Op1), kernel instructions 324 (which represent operator Op2), and kernel instructions 326 (which represent operator Op3), block diagrams 400 further include blocks 402, 404, 406, and 408 representing virtual data nodes. Each virtual data node can represent a logical tensor which can store output data elements of an operator, and from which input data elements can be fetched to another operator. For example, a virtual data node represented by block 402 can include a first logical tensor from which the first operator Op1 receives input data elements $i_0, \ldots i_n$. A virtual data node represented by block 404 can include a second logical tensor that stores the output data elements $a_0, \ldots a_n$ from the first operator Op1, and from which the second operator Op2 fetches the output data elements to assemble input data elements $b_0, \ldots b_n$. Moreover, a virtual data node represented by block 406 can include a third logical tensor that stores the output data elements $c_0, \ldots c_n$ from the second operator Op2, and from which the third operator Op3 fetches the output data elements to assemble input data elements $d_0, \ldots d_n$. Further, a virtual data node represented by block 408 can include a fourth logical tensor that stores the output data elements $e_0, \ldots e_n$ from the third operator Op3.

Figure 4B:
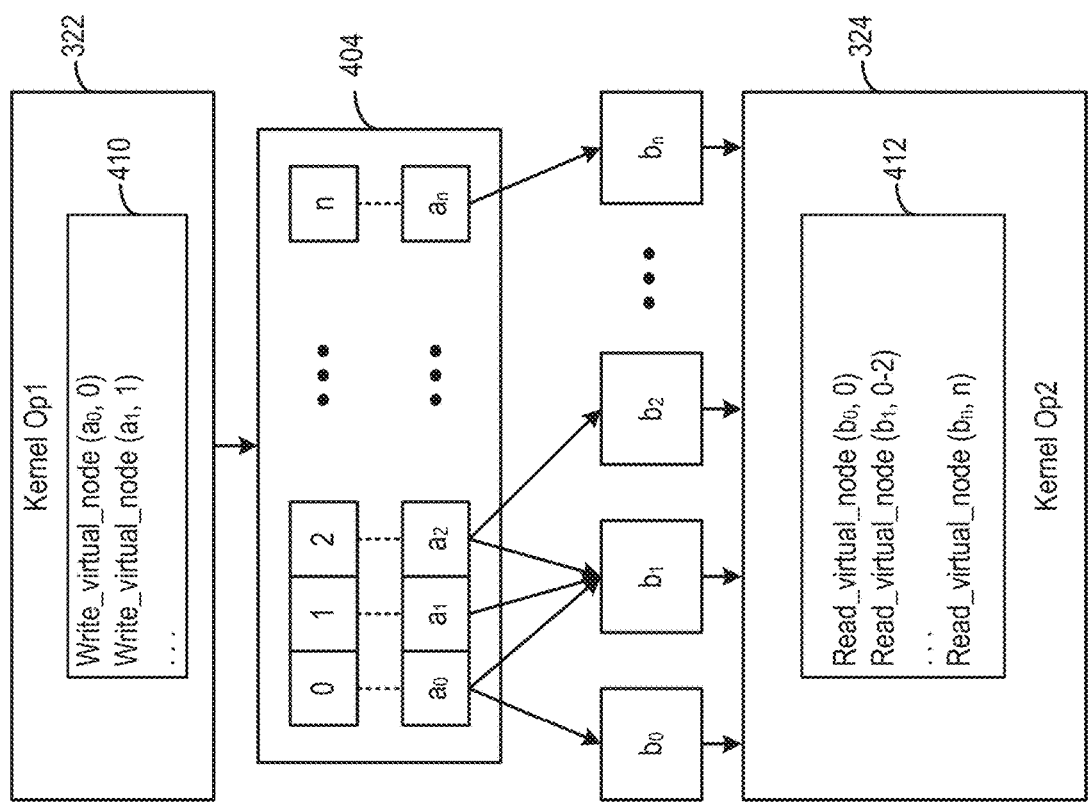

The logical tensor can provide a generic interface for data transfer between two kernels. FIG. 4B illustrates an example of a logical tensor represented by virtual data node 404, that can be used for data transfer between operators Op1 and Op2. Specifically, in FIG. 4B, the logical tensor can include multiple entries each associated with an index, such as 0, 1, 2, n, etc. Each index can be associated with a tensor address which can reflect the size of an entry in the logical tensor. For example, the tensor address associated with index 0 can be 0, the tensor address associated with index 1 can be 64, whereas the tensor address associated with index 2 can be 128. In FIG. 3A and in the rest of the specification, for simplicity, the tensor address is represented by the corresponding index.

Both kernels 322 and 324 can access the tensor addresses of the logical tensor to perform data transfer. Specifically, kernel 322 of operator Op1 can store output data elements $a_0, \ldots a_n$ at pre-determined tensor addresses within the logical tensor. Kernel 322 can include write instructions 410 to store output data element $a_0$ at an entry of the logical tensor 0 ("write_virtual_node ($a_0$, 0)"), to store output data element a1 at an entry of the logical tensor associated with tensor address 1 ("write_virtual_node ($a_1$, 1)"), to store output data element at an entry of the logical tensor associated with tensor address n, etc. Moreover, kernel 324 can include read instructions to fetch the input data elements from the logical tensor based on the tensor addresses. For example, kernel 324 can include read instructions 412 to fetch data element $a_0$ at tensor address 0 for input data element $b_0$ ("read_virtual_node ($b_0$, 0)"), to fetch data elements $a_0$, $a_1$, and $a_2$ from, respectively, tensor addresses 0, 1, and 2 to assemble data element $b_1$ ("read_virtual_node ($b_1$, 0-2)"), to fetch data element an from tensor address n for input data element $b_n$, etc.

The arrangements in FIG. 4B can reduce the engineering effort and complier complexity to support operator fusion. Specifically, each standalone kernel operates on a logical tensor represented by a virtual data node, which can be generic and is not tied to any specific memory or memory management scheme. This allows a generic kernel specific for an operator to be created and reused to assemble the instructions for different neural network topologies, just as the case in FIG. 3A.

On the other hand, unlike the arrangements in FIG. 3A where data transfer between operators is performed at a low off-chip memory, the arrangements in FIG. 4B allow the data transfer operation to be performed at an off-chip memory or at an on-chip memory. As to be described in details below, a compiler can be programmed to convert the read and write instructions to a virtual data node to either write/read instructions to an off-chip memory or to write/read instructions to an on-chip memory, based on whether the data transfer is between two fused operators. In some examples, the off-chip memory can be a DRAM, whereas the off-chip memory can be a scratchpad memory of a hardware accelerator, a SRAM cache of a CPU, etc.

In some examples, the compiler can generate the sequence of executable instructions to maximize the number of operators to be fused, but exclude an operator from the fused operators when, for example, limitations from the computing system prevent the fusion of that operator with other operators. Such limitations may arise from various sources. For example, the data can be of multi-channel and a particular channel of data needs to be accessed at a particular time, but the on-chip memory cannot provide such access at that time. As another example, the on-chip memory is simply too small to fit the multi-channel data. In all these cases, the compiler can remove an operator from the fused operators and generate off-chip memory read/write instructions to handle data transfer between that operator and the other fused operators.

Referring back to FIG. 4A, block diagram 460 can represent a sequence of executable instructions generated by the compiler from the instructions of block diagram 400. The compiler may attempt to fuse operators Op1, Op2, and Op3, but due to the aforementioned hardware limitations, the compiler can determine that operators Op1 and Op2 can be fused while excluding third operator Op3 from the fusion. Based on such determination, the compiler can convert the read and write instructions to virtual data node 404 to read and write instructions to an on-chip memory, such as a scratchpad memory of a hardware accelerator, a SRAM cache of a CPU, etc., as represented by block 380. The compiler can also convert the read and write instructions to other virtual data nodes, such as virtual data nodes 402, 406, and 408, to read and write instructions to an off-chip memory as represented by blocks 328, 342, and 344. Moreover, the compiler can also determine the sequence of write/read instructions to the on-chip memory based on the capacity of the on-chip memory. In addition, the compiler can also remove the instructions representing the virtual data nodes from the sequence of executable instructions represented by block diagram 460.

Figure 5A:
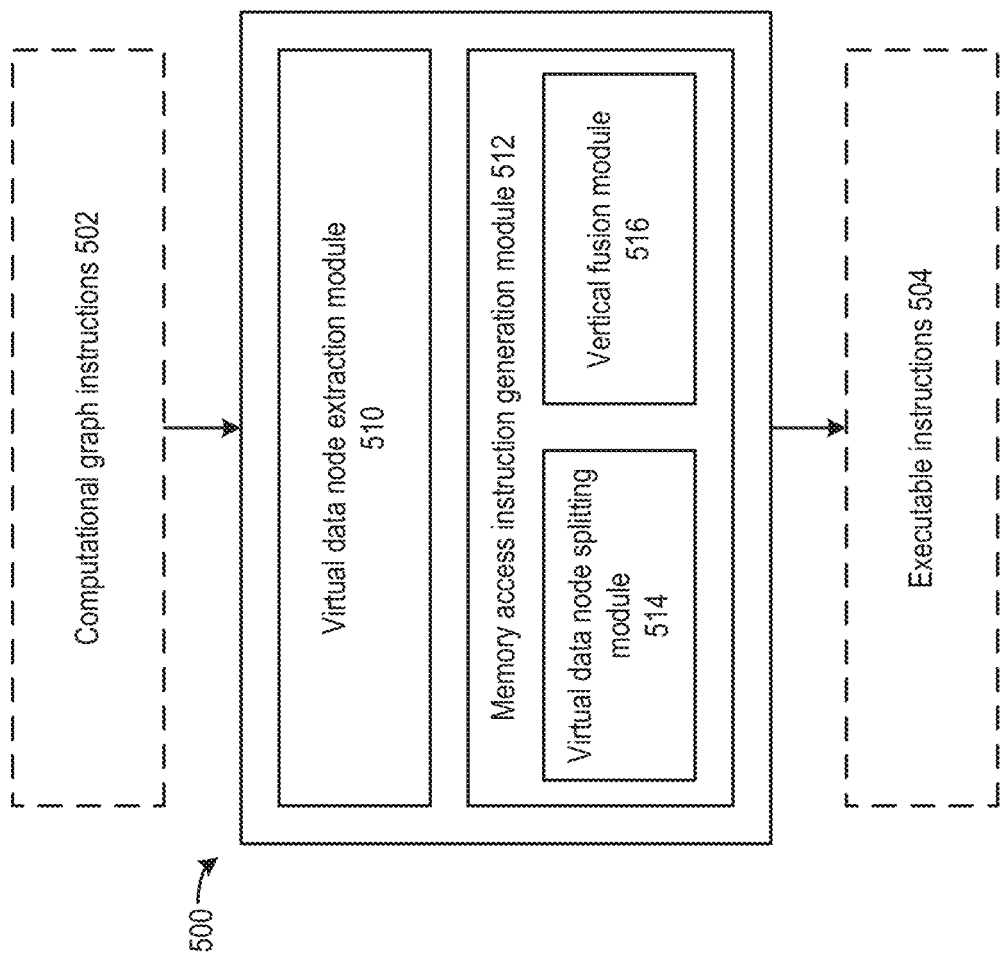
FIG. 5A-FIG. 5C illustrate examples of components of a compiler and its operations to perform operator fusion, according to certain aspects of the present disclosure.

FIG. 5A illustrates an example of a compiler 500. Compiler 500 can compile a computational graph instructions 502 including virtual data nodes, such as those represented by block diagram 400 of FIG. 4A, to a sequence of executable instructions 504, such as those represented by block diagram 460 of FIG. 4A. As shown in FIG. 5A, compiler 500 can include a virtual data node extraction module 510 and a memory access instruction generation module 512, which can further include a virtual data node splitting module 514 and a vertical fusion module 516.

Specifically, virtual data node extraction module 510 can extract, from computational graph instructions 502, access instructions to read or write to a virtual data node, such as write instructions 410 ("write_virtual_node") and read instructions 412 ("read_virtual_node") of FIG. 4B. Virtual data node extraction module 510 can also create virtual data node objects to represent data involved in the extracted read/write instructions based on the locations of these instructions with respect to the operators within the computation graph. For example, virtual data node extraction module 510 can create virtual data node 402 to represent data fetched by the read instructions to a first virtual data node in kernel instructions 322, based on the read instructions preceding the first operator Op1 in the computational graph. Virtual data node extraction module 510 can also create virtual data node 404 to represent data stored by write instructions to a second virtual data node in kernel instructions 324 and then fetched by read instructions to the second virtual data node in kernel instructions 322, based on these instructions being sandwiched between the first operator Op1 and the second operator Op2 in the computational graph. Virtual data node extraction module 510 can also create virtual data node 406 to represent data stored by the write instructions to a third virtual data node in kernel instructions 326 and then fetched by read instructions to the third virtual data node in kernel instructions 324, based on these instructions being sandwiched between the second operator Op2 and the third operator Op3 in the computational graph. Virtual data node extraction module 510 can also create virtual data node 408 to represent data stored by write instructions to a fourth virtual data node in kernel instructions 326, based on these instructions following the third operator Op3 in the computational graph.

Memory access instruction generation module 512 can convert the read and write instructions for data represented by each virtual data node, extracted by virtual data node extraction module 510, into memory access instructions to perform data transfer operations. To generate the instructions of the data transfer operations, virtual data node splitting module 514 can perform a splitting operation to split the virtual data node write and read instructions of a virtual data node into one or more virtual data sub-nodes. Vertical fusion module 516 can then perform a vertical fusion operation on each virtual data sub-node to generate memory write and read instructions to perform data transfer operations. The data involved in the data transfer operations of a virtual data sub-node is typically smaller than the capacity of an on-chip memory. In some examples, the data transfer operations of different virtual data sub-nodes can be performed in parallel at a memory to increase the speed of the data transfer operations.

Virtual data node splitting module 514 can create a plurality of access groups, with each access group comprising read instructions of one or more data elements that share at least a tensor address. Specifically, for a virtual data node, virtual data node splitting module 514 can first extract a read instruction to the virtual data node for a data element (or a plurality of data elements). Virtual data node splitting module 514 can search for an access group that includes corresponding write instructions of the same virtual data node that supply the data element(s) to be fetched by that read instruction, based on the common tensor address(es) shared by the corresponding read and write instructions. If no such access group exists, virtual data node splitting module 514 can create a new access group to include the corresponding read and write instructions, whereas if such access group does exist, virtual data node splitting module 514 can add the read instruction to the access group. For virtual data nodes that are not involved in data transfer between two operators (e.g., virtual data nodes 402 and 406), virtual data node splitting module 514 can pass the virtual data nodes and their read/write instructions to vertical fusion module 516 for processing.

Figure 5B:
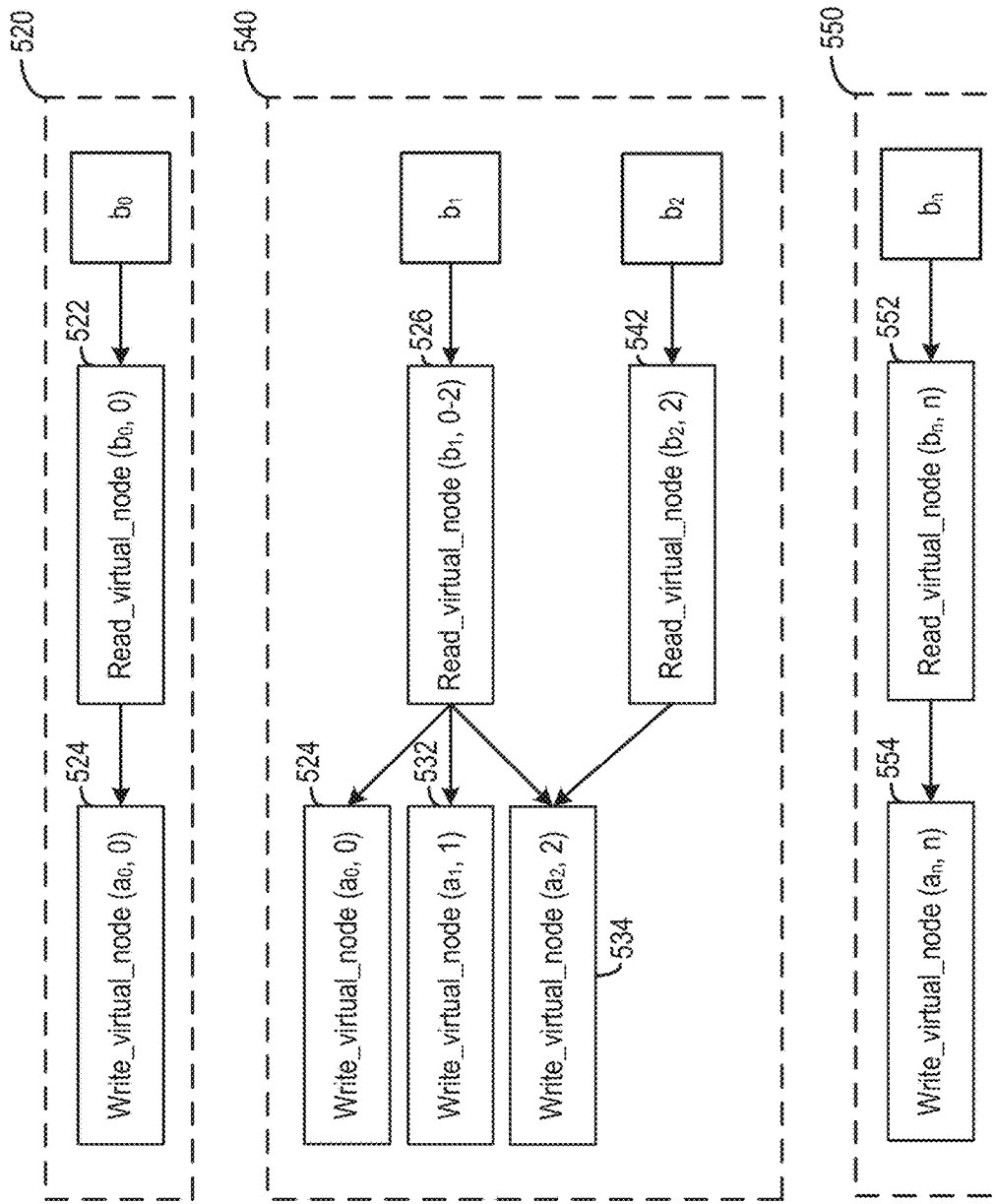

FIG. 5B illustrates an example splitting operation of virtual data node 404 by virtual data node splitting module 514. As represented by the arrows in FIG. 5B, virtual data node splitting module 514 can first create an access group 520 for a read instruction 522 for input data element b0, which access tensor address 0. Based on this tensor address of read instruction 522, virtual data module splitting module 514 can identify a write instruction 524 for output data element a0 at tensor address 0. As no access group is created at this point, virtual data module splitting module 514 can create access group 520 which includes the corresponding read instruction 522 and write instruction 524.

Virtual data node splitting module 514 can then process read instruction 526 which accesses tensor addresses 0, 1, and 2 for input data element b1. For read instruction 526, virtual data node splitting module 514 can identify the corresponding write instructions 524, 532, and 534 which writes output data elements $a_0$, $a_1$, and $a_2$ to tensor addresses 0, 1, and 2. Virtual data node splitting module 514 can look for an access group which includes write instructions 524, 532, and 534 (or a superset including write instructions 528a-528c). As only access group 520 is created at this point and access group 520 includes only write instruction 524, virtual data node splitting module 514 can create an access group 540 which includes read instructions 526, 528, 530 and corresponding write instructions 524, 532, and 534.

Virtual data node splitting module 514 can then process read instruction 542 which accesses tensor address 2 for input data element b2. For read instruction 542, virtual data node splitting module 514 can identify the corresponding write instruction 534 that writes output data element $a_2$ to tensor address 2. As access group 540 already includes write instruction 534, virtual data node splitting module 514 can add read instruction 542 to access group 540.

Virtual data node splitting module 514 can then process the rest of the read instructions in virtual data node 404 and may create additional access groups, such as access group 550 that includes read instruction 552 to tensor address n for input data element $b_n$ and the corresponding write instruction 554 that writes output data element and to tensor address n.

In FIG. 5B, the same write instruction to tensor address 0 ("write_virtual_node (a0, 0)") is in both access groups 520 and 540. While such arrangements can facilitate parallel data transfer operations, the duplication of the write operations can lead to more data being written into the memory. In an example modification to the splitting operation of FIG. 5B, the compiler can look for a first access group that has a subset of corresponding write instructions for a read instruction, and add the corresponding write instructions and the read instruction to the first access group if the projected total amount of data written by the existing write instructions of the first access group, and by the additional write instructions for the read instruction to be added to the first access group, is below a threshold. The threshold can be based on the capacity of the memory where the data transfer operation represented by the read/write instructions in the access groups are to take place. If the projected total amount of data exceeds the threshold, the compiler can look for a second access group that includes the corresponding write instructions and, if the second access group can be found, add the read instruction to the second access group. If neither the first access group nor the second access group can be found, the complier can then create a new access group for the read instruction and the corresponding write instructions, as described above.

Figure 5C:
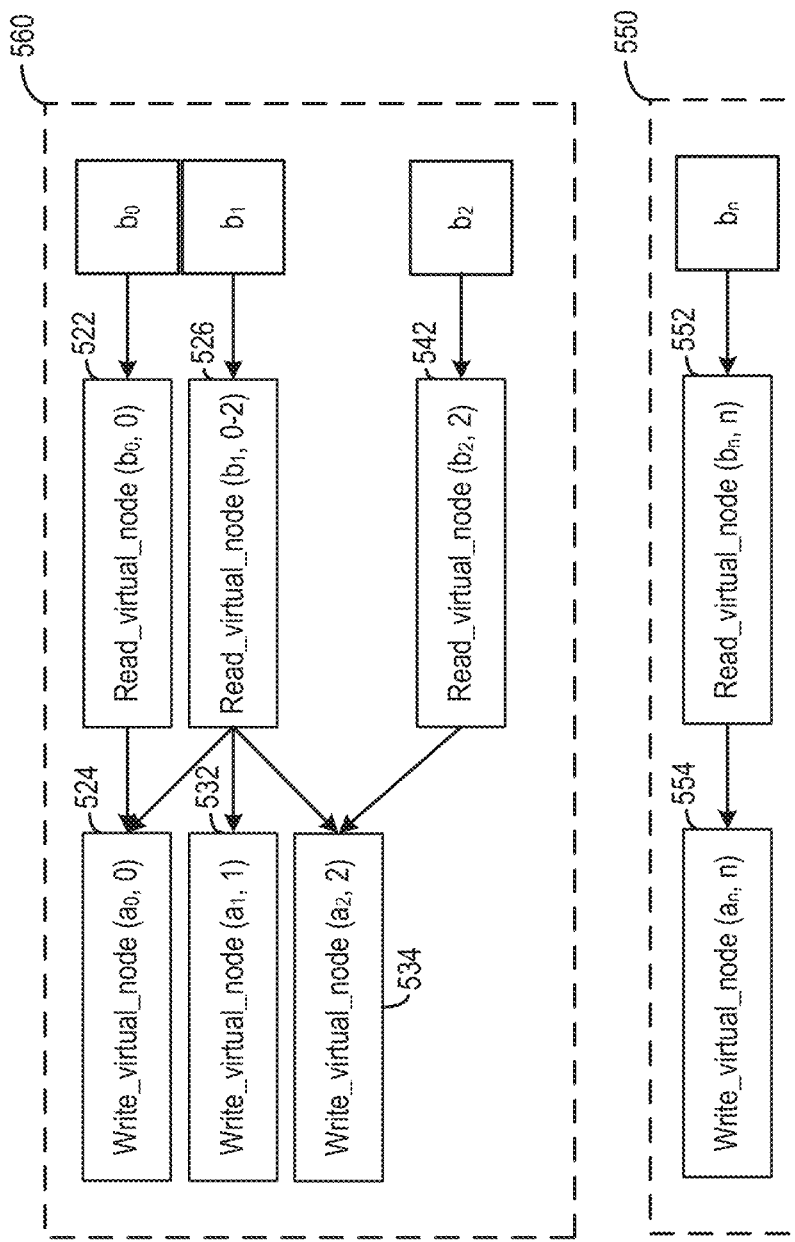

FIG. 5C illustrates an example of the modified splitting operation by virtual data node splitting module 514. As shown in FIG. 5C, virtual data node splitting module 514 can first create an access group 560 for read instruction 522 for input data element b0, which access tensor address 0. Based on this tensor address of read instruction 522, virtual data module splitting module 514 can identify a write instruction 524 for output data element a0 at tensor address 0. As no access group is created at this point, virtual data module splitting module 514 can create access group 520 which includes the corresponding read instruction 522 and write instruction 524.

Virtual data node splitting module 514 can then process read instruction 526 which access tensor addresses 0, 1, and 2 for input data element b1. For read instruction 526, virtual data node splitting module 514 can identify the corresponding write instructions 524, 532, and 534 which writes output data elements $a_0$, $a_1$, and $a_2$ to tensor addresses 0, 1, and 2. Virtual data node splitting module 514 can look for an access group which includes a subset of write instructions 524, 532, and 534, and finds access group 560 which includes write instruction 524. Virtual data node splitting module 514 can determine whether a projected total amount of data written by write instruction 524, and the additional write instructions 532 and 534 for the read instruction, is below a threshold. In the example of FIG. 5C, virtual data node splitting module 514 can determine that the projected total amount of data is below the threshold, and add write instructions 532 and 534, as well as read instruction 526, to access group 560.

Virtual data node splitting module 514 can then process read instruction 542 which accesses tensor address 2 for input data element b2. For read instruction 542, virtual data node splitting module 514 can identify the corresponding write instruction 534 that writes output data element $a_2$ to tensor address 2. As access group 560 already includes write instruction 534, virtual data node splitting module 514 can add read instruction 542 to access group 540.

Compared with FIG. 5B, write instruction 524 is not duplicated across different access groups. With such arrangements, the compiler can include more read and write instructions in an access group to reduce the duplication of the same write instruction across different access groups, to reduce the risk of over-capacity at the memory caused by duplicated data transfer operations.

Virtual data node splitting module 514 can then pass the virtual data sub-nodes, as well as virtual data nodes that were bypassed due to not having corresponding read and write instructions (e.g., virtual data nodes 402 and 406), to vertical fusion module 516. Vertical fusion module 516 can create memory access instructions for each virtual data sub-node and each virtual data node. For each virtual data node (which does not have corresponding read/write instructions), vertical fusion module 516 can convert the read or write instructions into memory read or memory write instructions for an on-chip memory (e.g., a CPU cache, a scratchpad in a hardware accelerator, etc.) if the virtual data node is involved in data transfer between two fused operators. On the other hand, if the virtual data node is not involved in data transfer between two fused operators, or as an input or output of an operator, vertical fusion module 516 can convert the read and/or write instructions of the virtual data node into off-chip memory read/write instructions. Vertical fusion module 516 can also perform certain on-chip memory management operations. For example, vertical fusion module 516 can allocate the spaces in the on-chip memory to the read and write instructions to fit the data elements that are being transferred by those instructions, and generate the memory read and write instructions including the addresses of the allocated spaces. In a case where vertical fusion module 516 cannot accommodate all the read and write instructions of a virtual sub-node in the on-chip memory, vertical fusion module 516 can place the read and write instructions to a larger memory, such as an off-chip memory.

After generating the memory access instructions for the virtual data nodes and virtual data sub-nodes, vertical fusion module 516 can then assemble an executable instruction file including the instructions of the operators as well as memory read and write instructions to on-chip memory and/or off-chip memory to support the operators. For example, referring back to FIG. 4A, vertical fusion module 516 can assemble an instruction file including memory read instructions to an off-chip memory for input data elements of kernel 322 of first operator Op1, instructions of kernel 322, memory write and memory read instructions to an on-chip memory for transfer of data elements between kernel 322 and kernel 324 of second operator Op2 (based on operators Op1 and Op2 being fused), instructions of kernel 324, memory write and memory read instructions to the off-chip memory for transfer of data elements between kernel 324 and kernel 326 of third operator Op3 (based on operators op2 and op3 not being fused), instructions of kernel 326, and memory write instructions to the off-chip memory to store the output data elements of kernel 326.

FIG. 6 illustrates an example flowchart of a method 600 of generating executable instructions for a computing system. The computing system may include, for example, a general purpose CPU, a hardware accelerator, etc. Method 600 can be performed by, for example, compiler 500 of FIG. 5A.

Method 600 starts with step 602, in which compiler receives a first set of instructions including a kernel of a first operator and a kernel of a second operator. The kernel of the first operator can include instructions of the first operator and write instructions to a virtual data node, whereas the kernel of the second operator can include instructions of the second operator and read instructions to the virtual data node. The first set of instructions can be in the form of a computational graph instruction represented by block diagram 400 of FIG. 4A. The first operator and the second operator can correspond to, respectively, a first layer and a second layer of a neural network and each can include various operations such as multiplication and summation operation, activation function processing, pooling operation, etc. The output data of the first operator/layer can be fetched to the second operator/layer as input. As shown in FIG. 4C, the virtual data node can correspond to a logical tensor to store the output data of the first operator and from which the second operator fetches input data, to provide the data transfer from the first operator to the second operator.

In step 604, the compiler determines, based on a mapping between the write instructions and read instructions, instructions of data transfer operations between the first operator and the second operator.

Specifically, the logical tensor represented by the virtual data node can include multiple entries, each entry being associated with a tensor address. The write instructions in the kernel of the first operator can include the tensor addresses to which the output data of the first operator are to be stored. Moreover, the read instructions in the second kernel can include the tensor addresses of entries from which the second operator is to fetch the input data. As such, each read instruction in the second kernel can be mapped to one or more write instruction, and each write instruction can be mapped to one or more read instruction, based on the tensor addresses included in the read and write instructions. The mapping between the read and write instructions can represent a connectivity between the first operator/layer and the second operator/layer.

To generate the instructions of the data transfer operations between the two operators, virtual data node extraction module 510 of compiler 500 can first extract, from the first set of instructions, the instructions to read and write to a virtual data node. Virtual data node extraction module 510 can also create virtual data node objects to represent data involved in the extracted read/write instructions based on the locations of the access instructions with respect to the operators within the computation graph. Memory access instruction generation module 512 can convert the read and write instructions for data represented by each virtual data node, extracted by virtual data node extraction module 510, into memory access instructions to perform data transfer operations. Specifically, virtual data node splitting module 514 can create a plurality of access groups, with each access group comprising read instructions of one or more data elements that share at least a tensor address. For a virtual data node, virtual data node splitting module 514 can first extract a read instruction to the virtual data node for a data element (or a plurality of data elements). Referring to FIG. 5B, virtual data node splitting module 514 can search for an access group that includes corresponding write instructions of the same virtual data node that supply the data element(s) to be fetched by that read instruction, based on the common tensor address(es) shared by the corresponding read and write instructions. If no such access group exists, virtual data node splitting module 514 can create a new access group to include the corresponding read and write instructions, whereas if such access group exists, virtual data node splitting module 514 can add the read instruction to the access group. In some examples, as shown in FIG. 5C, virtual data node splitting module 514 can also identify an access group that includes a subset of the corresponding write instructions for a read instruction, and add the read instruction and the corresponding write instructions to that access group if the total data to be written by the write instructions in that access group, together with the additional write instructions for that read instruction to be added to the access group, is below a threshold, to reduce duplicate write instructions across access groups. A virtual data sub-node can then be created for each access group.

After splitting the virtual data node into virtual data sub-nodes, the compiler can perform a vertical fusion operation on each virtual data sub-node. Specifically, the compiler can generate a memory read instruction and a memory write instruction to a memory for each pair of corresponding read instruction and write instruction (to the same tensor address) at the virtual data sub-node. The compiler can also generate the memory read and memory write instructions and addresses based on the size and usage of the memory, and in a case where the memory cannot support the amount of data involved in the memory read and write, the compiler can instead generate read/write instructions to another larger memory (e.g., an off-chip memory, such as DRAM), to move the data operations to the off-chip memory. In a case where the virtual data sub-node includes read instructions that have no corresponding write instructions (or vice versa), such as in the case where the virtual data sub-node is at the input of the first operator or at the output of the second operator, the compiler can also generate off-chip memory read or off-chip memory write instructions for the virtual data sub-node.

In step 606, the compiler can then generate a second set of instructions representing a fused operator of the first operator and the second operator and including the instructions of the first operator, the instructions of the second operator, and the memory read and memory write instructions for the data transfer.

Figure 7:
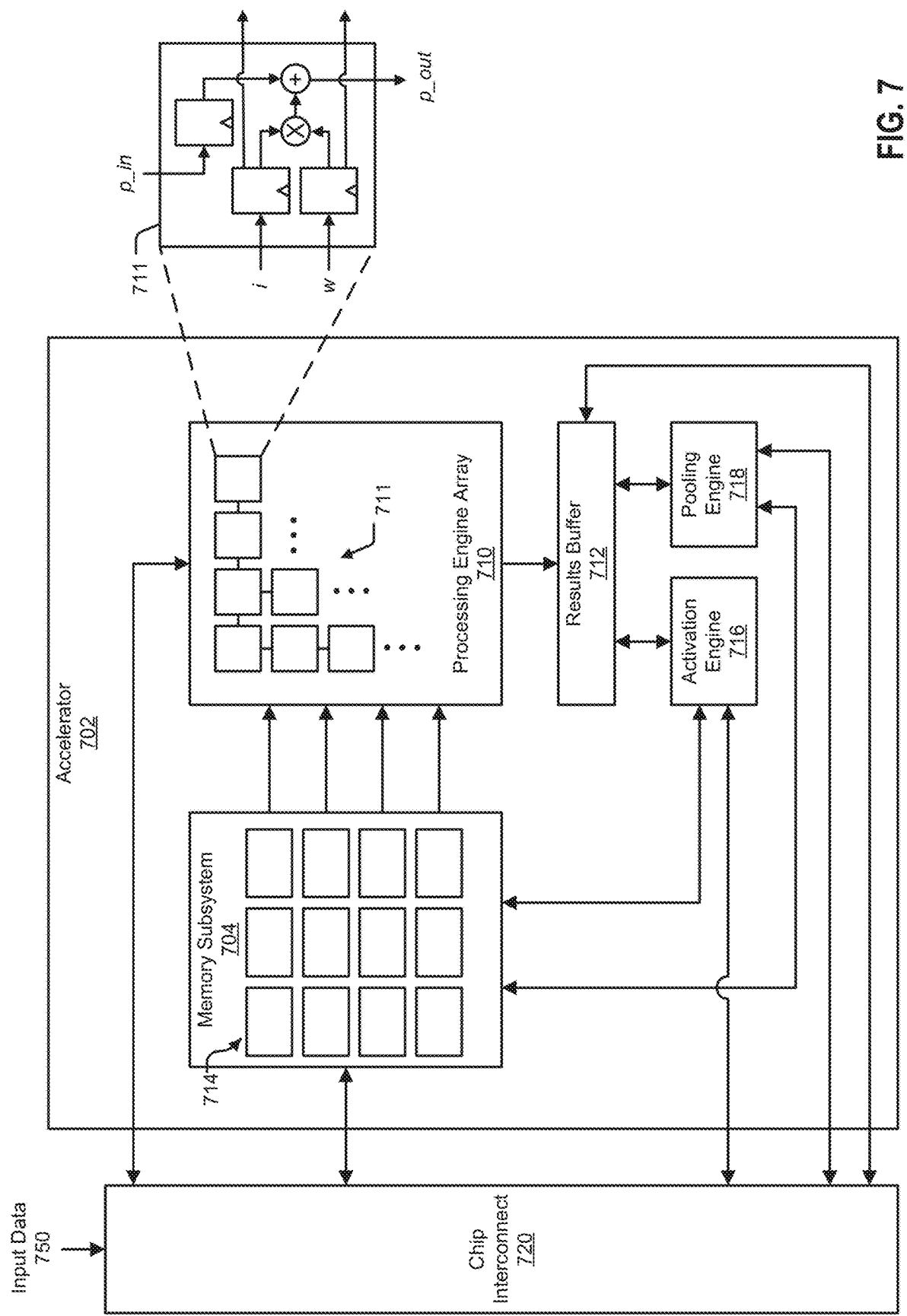
FIG. 7 includes an example integrated circuit device that executes the instructions generated using the disclosed techniques.

FIG. 7 is a block diagram illustrating an example of an integrated circuit device that can execute the instructions generated based on the disclosed techniques. The example of FIG. 7 illustrates an accelerator 702. In various examples, the accelerator 702, for a set of input data (e.g., input data 750), can execute computations using a processing engine array 710, an activation engine 716, and/or a pooling engine 718. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other. In some examples, accelerator 702 can be programmed by instructions generated based on the disclosed techniques to perform data transfer between fused operators using memory subsystem 704.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716 and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things, and can execute kernel instructions of an operator. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 428 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples. Activation engine 716 can be programmed by instructions to implement, for example, activation function processing operations for an operator.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed. Pooling engine 718 can be programmed by instructions to implement, for example, pooling operations for an operator.

Herein, the activation engine 716 and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750.

In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
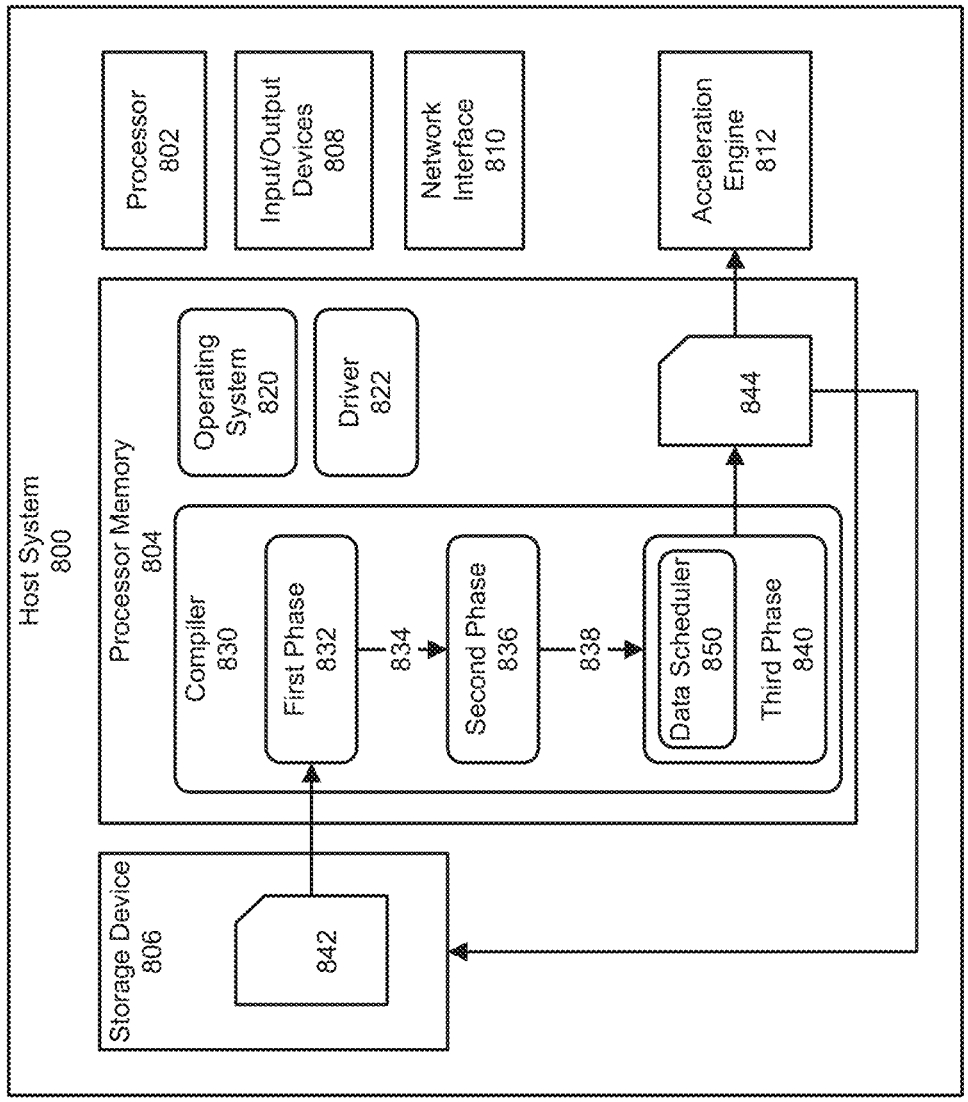
FIG. 8 includes an example host system including a compiler implemented using the disclosed techniques.

FIG. 8 includes a block diagram illustrating an example of a host system 800 on which a compiler 830, such as is described herein, can run. The illustrated host system 800 is an example of a computing device, and includes a processor 802, a processor memory 804, at least one storage device 806, various Input/Output (I/O) devices 808, and at least one network interface 810. In the example of FIG. 8, the host system 800 also includes an acceleration engine 812, which can include accelerator 702 of FIG. 7. In various examples, the host system 800 can be implemented as a server in a data center, a desktop computer, a laptop computer, a tablet computer, or a smartphone, among other examples. In some examples, operations or components discussed below as performed or included in the host system 800 can be performed or included in other computer devices. For example, the compiler 830 can execute on the host system 800 while the acceleration engine 812 is located at a different host system.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data on which the processor 802 is operating. In various examples, the processor memory 804 is a volatile memory type, such as a type of Random Access Memory, though non-volatile memory types can, alternatively or additionally, be used for the processor memory 804.

The storage device 806 is an example of a device that can include non-volatile memory. For example, the storage device 806 can be a magnetic disk drive, a solid state drive, or an optical drive, among other examples. The storage device 806 can further be non-transitory, such that program code and other data stored on the storage device 806 remains present when the storage device 806 is not powered on.

The storage device 806 is one example of a peripheral device, which are components that can be coupled to the host system 800 to add functionality to the host system 800. Other examples of peripheral devices include the Input/Output devices 808 and the network interface 810. The Input/Output devices 808 can include user input and output devices, such as keyboards, mice, touch screens, microphones, display screens, speakers, printers, and scanners, among other examples. The network interface 810, which can be implemented using a network interface card, can provide access to one or more networks. The network interface 810 can include, for example, a physical port for connecting a network cable and/or wireless antennas for communicating with Wi-Fi and/or cellular networks. The network interface 810 can also be described as an I/O device.

The acceleration engine 812 is also another type of peripheral device or I/O device. The acceleration engine 812 is a device that is purpose built to perform certain operations that can be performed by the processor 802, but can be performed faster by the acceleration engine 812. For example, the acceleration engine 812 can be a neural network accelerator, and, as such, may be able to perform the large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network, such as one that performs image recognition or one that performs machine translation. As a further example, to support the execution of a neural network, the acceleration engine 812 can be programed to perform operations such as copying data for the neural network from processor memory 804 (for example) into the acceleration engine 812, copying input data for the neural network from processor memory 804 into the acceleration engine 812, and/or copying results from the acceleration engine 812 into the processor memory 804, among other examples.

To generate program code for the acceleration engine 812, in various examples, the host system 800 can execute the compiler 830. Compilers, in general, are software programs that translate program code written in a human-readable language into a format (e.g., machine instructions) that can be read and processed by an integrated circuit device. In the example of FIG. 8, the acceleration engine 812 is a neural network accelerator and the compiler 830 is for compiling a neural network description into instructions to be executed by the acceleration engine 812. When the acceleration engine 812 implements a different type of accelerator, another compiler can be used. Compiler 830 can include, for example, the components described in FIG. 5A.

The compiler 830 can be activated, for example, when the operating system 820 receives keyboard, mouse, touchscreen, voice commands, or other inputs from the Input/Output devices 708. The inputs can further include parameters for the compiler 830, such as the input code 842 to compile and configuration options for the compilation process. Once the compiler 830 is activated, the processor 802 can load the instructions for the compiler 830 into the processor memory 804, and can execute the instructions.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one of the stages into multiple stages.

The first stage 832 can receive and process input code 842. The input code 842 can describe a program in a high-level programming language, such as Java, C++, or Tensorflow, among many other examples. The input code 842 can describe, for example, steps to perform image recognition, speech recognition, machine translation, or other operations. The input code 842 can be obtained, for example, from the storage device 806. Alternatively, though not illustrated here, the input code 842 may be located in the processor memory 804 or can be obtained from a network location, using the network interface 810. Processing of the input code 842 can include sorting the operations described in the input code 842 into layers, where the outputs of one layer provide the inputs to a next layer. Processing can also include identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

The output 834 of the first stage 832 can be organized, for example, in the layers, nodes, and connections between nodes of a neural network. Each layer can correspond to an operator. The output 834 for each operator may also include write and read instructions to a virtual data node to perform data transfer between operators. The second stage 836 can perform intermediate processing on this output 834, which can include, for example, identifying the virtual data node and the associated virtual data node read and write instructions, pairing corresponding virtual data node read and write instructions and splitting them into virtual data sub-nodes which involve data that can fit into the limited amount of locale storage space, and converting the read and write instructions to the locale storage space, as described in FIG. 4A-FIG. 5C. Processing of the output 834 of the first stage 832 can include other steps, such as scheduling, or determining the order in which the acceleration engine 812 and/or processor 802 will perform operations, among other examples.

In various examples, the output 838 of the second stage 836 includes the various steps to be performed by components of the acceleration engine 812, in the order that the steps are to be performed. The output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 840 can operate on the output 838 of the second stage 836, and perform various steps before producing the instructions that are to be executed by the acceleration engine 812. These steps can include, for example, removing redundant dependencies, resolving or handling dependencies between nodes by inserting synchronization instructions into the code, identifying possibly optimizations in memory usage or memory bandwidth usage, and other operations.

The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network that the acceleration engine 812 is to execute, as well as the location in the processor memory 804 or on the storage device 806 where the compiled code 844 for the neural network is located. The driver 822 can further load into the acceleration engine 812 or cause the acceleration engine 812 to load the compiled code 844, can load or cause the acceleration engine 812 to load the input data on which the neural network is to operate, and/or can cause the acceleration engine 812 to being executing on the input data. Once the acceleration engine 812 has finished, the acceleration engine 812 can notify the driver 822, and the driver 822 can deliver a result back to the application that requested the result.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A compiler-implemented method of generating executable instructions for a computing system, comprising:
    receiving a first set of instructions including a kernel of a first operator and a kernel of a second operator, the kernel of the first operator including instructions of the first operator and write instructions to a virtual data node, the kernel of the second operator including instructions of the second operator and read instructions to the virtual data node;
    determining a mapping between the write instructions and read instructions based on common tensor addresses shared by the write instructions and the read instructions;
    determining, based on a mapping between the write instructions and read instructions, instructions of data transfer operations between the first operator and the second operator, wherein the instructions of the data transfer operations are determined such that a duplication of a same write instruction from the write instructions is reduced; and
    generating a second set of instructions representing a fused operator of the first operator and the second operator, the second set of instructions being executable by the computing system and including the instructions of the first operator, the instructions of the second operator, and the instructions of the data transfer operations.

2. The compiler-implemented method of claim 1, further comprising:
    wherein the virtual data node represents a logical tensor to store output data of the first operator and from which the second operator fetches input data.

3. The compiler-implemented method of claim 2, further comprising:
    wherein the logical tensor represented by the virtual data node includes entries each associated with a tensor address;
    wherein the write instructions include the tensor addresses of the entries to store the output data;
    wherein the read instructions include the tensor addresses of the entries from which the input data are to be fetched.

4. The compiler-implemented method of claim 1, further comprising:
    identifying the virtual data node based on identifying the write instructions to the virtual data node and the read instructions to the virtual data node; and
    associating the write instructions and the read instructions with the virtual data node.

5. The compiler-implemented method of claim 4, further comprising:
    creating a plurality of access groups, each of the plurality of access groups including at least one of the read instructions and at least one corresponding write instruction mapped to the at least one of the read instructions; and
    converting, for each of the plurality of access groups, the at least one of the read instructions to at least one memory read instruction at a memory and the least one corresponding write instruction to at least one memory write instruction at the memory.

6. The compiler-implemented method of claim 5, further comprising:
    determining, for one of the read instructions, that a first access group includes all of the corresponding write instructions mapped to the one of the read instructions; and
    adding the one of the read instructions to the first access group.

7. The compiler-implemented method of claim 5, further comprising:
    determining, for one of the read instructions, that a first access group includes a first subset of corresponding write instructions mapped to the one of the read instructions but not the remaining subset of the corresponding write instructions;

determining that a total amount of data to be written by the write instructions of the first access group and by the remaining subset of the corresponding write instructions is below a threshold; and responsive to determining that the total amount of data is below the threshold, adding the one of the read instructions and the remaining subset of the corresponding write instructions to the first access group.

8. The compiler-implemented method of claim 5, further comprising:

for each access group, and based on determining that the first operator and the second operator are to be fused, converting the at least one of the read instructions to at least one memory read instruction at an on-chip memory internal to the computing system and the least one corresponding write instruction to at least one memory write instruction at the on-chip memory.

9. The compiler-implemented method of claim 5, further comprising:

wherein the read instructions of the plurality of access groups are to be performed in parallel; and wherein the write instructions of the plurality of access groups are to be performed in parallel.

10. The compiler-implemented method of claim 1, further comprising:

determining that a total amount of data involved in the data transfer operations exceeds a threshold; and responsive to determining that the total amount exceeds the threshold, generating the instructions of the data transfer operations as access instructions at an off-chip memory external to the computing system.

11. The compiler-implemented method of claim 1, further comprising:

wherein the virtual data node is a first virtual data node;

wherein the kernel of the first operator further includes read instructions at a second virtual data node;

wherein the kernel of the second operator further includes write instructions at a third virtual data node; and wherein the compiler-implemented method further comprises:

responsive to determining that read instructions at the second virtual data nodes $d_0$ not have corresponding write instructions, converting the read instructions at the second virtual data nodes to memory read instructions at an off-chip memory external to the computing system; and responsive to determining that write instructions at the third virtual data nodes $d_0$ not have corresponding read instructions, converting the write instructions at the third virtual data nodes to memory write instructions at the off-chip memory.

12. The compiler-implemented method of claim 1, further comprising:

wherein the computing system comprises a hardware accelerator.

13. The compiler-implemented method of claim 1, further comprising:

wherein the first operator and the second operator are associated with, respectively, a first neural network layer and a second neural network layer of a neural network implemented by the computing system.

14. A non-transitory computer-readable medium comprising instructions that, when executed by one or more processors, cause the one or more processors to execute a compiler by performing operations comprising:

receiving a first set of instructions including a kernel of a first operator and a kernel of a second operator, the kernel of the first operator including instructions of the first operator and write instructions to a virtual data node, the kernel of the second operator including instructions of the second operator and read instructions to the virtual data node;

determining a mapping between the write instructions and read instructions based on common tensor addresses shared by the write instructions and the read instructions;

determining, based on a mapping between the write instructions and read instructions, instructions of data transfer operations between the first operator and the second operator, wherein the instructions of the data transfer operations are determined such that a duplication of a same write instruction from the write instructions is reduced; and generating a second set of instructions representing a fused operator of the first operator and the second operator, the second set of instructions being executable by a computing system and including the instructions of the first operator, the instructions of the second operator, and the instructions of the data transfer operations.

15. The non-transitory computer-readable medium of claim 14, further comprising:

wherein the virtual data node represents a logical tensor to store output data of the first operator and from which the second operator fetches input data.

16. The non-transitory computer-readable medium of claim 15, further comprising:

wherein the logical tensor represented by the virtual data node includes entries each associated with a tensor address;

wherein the write instructions include the tensor addresses of the entries to store the output data;

wherein the read instructions include the tensor addresses of the entries from which the input data are to be fetched.

17. The non-transitory computer-readable medium of claim 14, further comprising:

wherein the operations further comprise:

identifying the virtual data node based on identifying the write instructions to the virtual data node and the read instructions to the virtual data node; and associating the write instructions and the read instructions with the virtual data node.

18. The non-transitory computer-readable medium of claim 17, further comprising:

wherein the operations further comprise:

creating a plurality of access groups, each of the plurality of access groups including at least one of the read instructions and at least one corresponding write instruction mapped to the at least one of the read instructions; and converting, for each of the plurality of access groups, the at least one of the read instructions to at least one memory read instruction at a memory and the least one corresponding write instruction to at least one memory write instruction at the memory.

19. The non-transitory computer-readable medium of claim 18, further comprising:
  wherein the operations further comprise:
    determining, for one of the read instructions, that a first access group includes all of the corresponding write instructions mapped to the one of the read instructions; and
    adding the one of the read instructions to the first access group.

20. An apparatus comprising:
  one or more processors; and
  a non-transitory computer-readable medium storing a compiler, wherein the one or more processors are configured to execute the compiler by performing operations comprising:
    receiving a first set of instructions including a kernel of a first operator and a kernel of a second operator, the kernel of the first operator including instructions of the first operator and write instructions to a virtual data node, the kernel of the second operator including instructions of the second operator and read instructions to the virtual data node;
    determining a mapping between the write instructions and read instructions based on common tensor addresses shared by the write instructions and the read instructions;
    determining, based on a mapping between the write instructions and read instructions, instructions of data transfer operations between the first operator and the second operator, wherein the instructions of the data transfer operations are determined such that a duplication of a same write instruction from the write instructions is reduced; and
    generating a second set of instructions representing a fused operator of the first operator and the second operator, the second set of instructions being executable by a computing system and including the instructions of the first operator, the instructions of the second operator, and the instructions of the data transfer operations.

\* \* \* \* \*